United States Patent
Ait Sab et al.

(10) Patent No.: US 11,368,216 B2
(45) Date of Patent: Jun. 21, 2022

(54) USE OF BAND-PASS FILTERS IN SUPERVISORY SIGNAL PATHS OF AN OPTICAL TRANSPORT SYSTEM

(71) Applicant: Alcatel Submarine Networks, Nozay (FR)

(72) Inventors: Omar Ait Sab, Nozay (FR); Ludivine Moirot, Nozay (FR)

(73) Assignee: ALCATEL SUBMARINE NETWORKS, Nozay (FR)

( * ) Notice: Subject to any disclaimer, the term of this patent is extended or adjusted under 35 U.S.C. 154(b) by 0 days.

(21) Appl. No.: 16/613,274

(22) PCT Filed: Mar. 16, 2018

(86) PCT No.: PCT/EP2018/056770
§ 371 (c)(1),
(2) Date: Nov. 13, 2019

(87) PCT Pub. No.: WO2018/210470
PCT Pub. Date: Nov. 22, 2018

(65) Prior Publication Data
US 2020/0195341 A1    Jun. 18, 2020

(30) Foreign Application Priority Data

May 17, 2017  (EP) .................................. 17305569
May 17, 2017  (EP) .................................. 17305570

(51) Int. Cl.
*H04B 10/07*      (2013.01)
*H04B 10/077*     (2013.01)
(Continued)

(52) U.S. Cl.
CPC ..... *H04B 10/0777* (2013.01); *H04B 10/2589* (2020.05); *H04B 10/27* (2013.01);
(Continued)

(58) Field of Classification Search
CPC ............ H04B 10/0777; H04B 10/2589; H04B 10/27; H04B 10/2972; H04B 10/07;
(Continued)

(56) References Cited

U.S. PATENT DOCUMENTS 5,436,746 A * 7/1995 Hirst .................... H04B 10/035
375/213
5,469,428 A    11/1995 Tokura et al.
(Continued)

FOREIGN PATENT DOCUMENTS

| EP | 0981215 A2 | 2/2000 |
| EP | 1035669 A1 | 9/2000 |

(Continued)

OTHER PUBLICATIONS

International Search Report and Written Opinion for corresponding International application No. PCT/EP2018/056770; dated Jun. 7, 2018 (11 pages).
(Continued)

*Primary Examiner* — Dibson J Sanchez
(74) *Attorney, Agent, or Firm* — Mendelsohn Dunleavy, P.C.; Yuri Gruzdkov; Steve Mendelsohn

(57) ABSTRACT

A bidirectional optical repeater having two unidirectional optical amplifiers and a supervisory optical circuit connected to optically couple the optical ports thereof. In an example embodiment, the supervisory optical circuit provides one or more pathways therethrough for supervisory optical signals, each of these pathways having located therein a respective narrow band-pass optical filter. The supervisory optical circuit further provides one or more pathways therethrough configured to bypass the corresponding narrow band-pass optical filters in a manner that enables backscattered light of any wavelength to cross into the optical path that has therein
(Continued)

the unidirectional optical amplifier directionally aligned with the propagation direction of the backscattered light.

11 Claims, 9 Drawing Sheets

(51) Int. Cl.
*H04B 10/25* (2013.01)
*H04B 10/27* (2013.01)
*H04B 10/297* (2013.01)
*H04J 14/02* (2006.01)
*G01M 11/00* (2006.01)
*H04B 10/071* (2013.01)
*H04B 10/29* (2013.01)

(52) U.S. Cl.
CPC ...... *H04B 10/2972* (2013.01); *H04J 14/0279* (2013.01); *G01M 11/3109* (2013.01); *H04B 10/07* (2013.01); *H04B 10/071* (2013.01); *H04B 10/29* (2013.01)

(58) Field of Classification Search
CPC ... H04B 10/071; H04B 10/29; H04J 14/0279; G01M 11/3109
USPC .......................................... 398/9–38, 43–103
See application file for complete search history.

(56) References Cited

U.S. PATENT DOCUMENTS

| | | | | |
|---|---|---|---|---|
| 5,737,105 | A * | 4/1998 | Ohta | H04B 10/035 398/18 |
| 5,801,878 | A * | 9/1998 | Bourret | H04B 10/291 359/341.2 |
| 5,825,515 | A * | 10/1998 | Anderson | H04B 10/035 398/180 |
| 5,926,263 | A * | 7/1999 | Lynch | H04B 10/035 356/73.1 |
| 6,008,934 | A | 12/1999 | Fatehi et al. | |
| 6,301,404 | B1 * | 10/2001 | Yoneyama | H04B 10/2589 385/24 |
| 6,522,796 | B1 | 2/2003 | Ziari et al. | |
| 6,603,587 | B1 * | 8/2003 | Yokoyama | H04B 10/07 398/178 |
| 6,671,464 | B1 | 12/2003 | Kikuchi | |
| 6,708,004 | B1 | 3/2004 | Homsey | |
| 7,068,945 | B2 | 6/2006 | Ogiwara et al. | |
| 7,099,581 | B2 | 8/2006 | Evangelides, Jr. et al. | |
| 7,872,738 | B2 | 1/2011 | Abbott | |
| 7,885,539 | B2 | 2/2011 | Leppla et al. | |
| 8,009,983 | B2 | 8/2011 | Zhang | |
| 8,135,274 | B2 | 3/2012 | Zhang et al. | |
| 8,280,253 | B2 | 10/2012 | Genay et al. | |
| 8,502,964 | B2 | 8/2013 | Wang et al. | |
| 8,559,813 | B2 | 10/2013 | Harman | |
| 8,676,053 | B2 | 3/2014 | Wang et al. | |
| 8,805,183 | B2 | 8/2014 | Dvir | |
| 8,837,938 | B2 | 9/2014 | Liu et al. | |
| 8,942,556 | B2 | 1/2015 | Zhao et al. | |
| 9,008,503 | B2 | 4/2015 | Urban et al. | |
| 9,036,991 | B2 | 5/2015 | Aguren | |
| 9,042,721 | B2 | 5/2015 | Randel et al. | |
| 9,059,797 | B2 * | 6/2015 | Wang | H04B 10/0771 |
| 9,130,672 | B2 | 9/2015 | Zhang | |
| 9,143,228 | B2 | 9/2015 | Sandstrom | |
| 9,154,258 | B1 | 10/2015 | Mertz et al. | |
| 9,170,173 | B2 | 10/2015 | Perron et al. | |
| 9,240,836 | B1 | 1/2016 | Chen | |
| 9,276,672 | B2 | 3/2016 | Zhang et al. | |
| 9,310,274 | B2 | 4/2016 | Nagel et al. | |
| 9,341,543 | B2 | 5/2016 | Viswanathan | |
| 9,960,845 | B2 | 5/2018 | Ngo et al. | |
| 10,587,343 | B2 * | 3/2020 | Mikami | H04B 10/077 |
| 2002/0131099 | A1 | 9/2002 | Harasawa | |
| 2002/0131696 | A1 | 9/2002 | Yokoyama et al. | |
| 2003/0072064 | A1 * | 4/2003 | Ohta | H04B 10/2916 398/177 |
| 2003/0081285 | A1 * | 5/2003 | Shimojoh | H04B 10/298 398/79 |
| 2004/0146305 | A1 | 7/2004 | Neubelt et al. | |
| 2004/0161244 | A1 | 8/2004 | Yokoyama et al. | |
| 2004/0201882 | A1 | 10/2004 | Kikuchi | |
| 2005/0226614 | A1 | 10/2005 | Ogiwara et al. | |
| 2005/0259998 | A1 | 11/2005 | Fujieda et al. | |
| 2006/0140627 | A1 * | 6/2006 | Yokoyama | H04B 10/077 398/30 |
| 2006/0251423 | A1 | 11/2006 | Evangelides, Jr. et al. | |
| 2007/0115456 | A1 | 3/2007 | Wisseman | |
| 2007/0201873 | A1 | 8/2007 | Buabbud et al. | |
| 2008/0050120 | A1 | 2/2008 | Neubelt | |
| 2009/0154919 | A1 * | 6/2009 | Desbruslais | H04B 10/035 398/11 |
| 2009/0324249 | A1 | 12/2009 | Zhang | |
| 2010/0092178 | A1 | 4/2010 | Liu et al. | |
| 2010/0322627 | A1 | 12/2010 | Desbruslais et al. | |
| 2011/0085231 | A1 * | 4/2011 | Bolshtyansky | H01S 3/06754 359/341.33 |
| 2011/0216996 | A1 | 9/2011 | Rogers | |
| 2012/0136660 | A1 | 5/2012 | Harman et al. | |
| 2012/0257899 | A1 | 10/2012 | Richardson et al. | |
| 2013/0004162 | A1 | 1/2013 | Osaka | |
| 2013/0216176 | A1 | 8/2013 | Li et al. | |
| 2014/0086573 | A1 | 3/2014 | Zhang et al. | |
| 2014/0105595 | A1 * | 4/2014 | Grasso | H04B 10/298 398/28 |
| 2014/0212130 | A1 | 7/2014 | Urban et al. | |
| 2014/0212131 | A1 | 7/2014 | Zhang | |
| 2015/0155934 | A1 | 6/2015 | Nakagawa et al. | |
| 2015/0171958 | A1 | 6/2015 | Webb et al. | |
| 2016/0099851 | A1 | 4/2016 | Archambault et al. | |
| 2016/0261340 | A1 | 9/2016 | Yang et al. | |
| 2017/0359127 | A1 | 12/2017 | Moeller et al. | |
| 2020/0036447 | A1 | 1/2020 | Ait Sab et al. | |
| 2020/0235816 | A1 * | 7/2020 | Zhang | H04J 14/0221 |

FOREIGN PATENT DOCUMENTS

| | | |
|---|---|---|
| EP | 1591768 A1 | 11/2005 |
| EP | 2088697 A1 | 8/2009 |
| EP | 2685641 A1 | 1/2014 |
| EP | 3076565 A1 | 10/2016 |
| EP | 3404852 A1 | 11/2018 |
| EP | 3404855 A1 | 11/2018 |
| EP | 3439200 A1 | 2/2019 |
| EP | 3599726 A1 | 1/2020 |
| JP | H03-42927 A | 2/1991 |
| JP | 2000209151 A | 7/2000 |
| JP | 2001148665 A | 5/2001 |
| WO | WO2017168994 A1 | 10/2017 |
| WO | 2018210586 A1 | 11/2018 |
| WO | WO2018210470 A1 | 11/2018 |

OTHER PUBLICATIONS

International Preliminary Report on Patentability for corresponding International application No. PCT/EP2018/056770; dated Nov. 19, 2019 (8 pages).
White Paper "Line Monitoring and Control in Subsea Networks", www.Xtera.com, 2017 [retrieved on Sep. 20, 2019] Retrieved from the Internet: <URL: https://www.xtera.com/wp-content/uploads/2017/05/White-Paper-Line-Monitoring-and-Control-in-Subsea-Networks-Xtera-August-2016.pdf> (8 pages).
Bao, Xiaoyi et al., "Recent progress in distributed fiber optic sensors." Sensors 12.7 (2012): 8601-8639.
ITU-T Telecommunication Standard "G.694.1—Spectral grids for WDM applications: DWDM frequency grid", International Telecommunication Union, Feb. 2012 (16 pages).
Chen, Hongxin et al."Reduction of the impairment of online OTDR monitoring by use of a narrow bandwidth OTDR and an optical

(56) References Cited

OTHER PUBLICATIONS bandpass filter." IEEE Photonics Technology Letters 16.9 (2004): pp. 2198-2200.

Moeller, Lothar, et al. "Mitigating Nonlinear Crosstalk from In-service Line Monitoring Equipment for Undersea Communication Systems." 2017 European Conference on Optical Communication (ECOC). IEEE, 2017. 3 pages.

Kim, Hyun Deok et al. "A low-cost WDM source with an ASE injected Fabry-Perot semiconductor laser." IEEE Photonics Technology Letters 12.8 (2000): 1067-1069.

ITU-T Telecommunication Standard "G.979—Characteristics of monitoring systems for optical submarine cable systems", International Telecommunication Union, Nov. 2016 (16 pages).

Non-Final Rejection for U.S. Appl. No. 16/793,294; dated Sep. 2, 2020 (21 pages).

\* cited by examiner

100

USE OF BAND-PASS FILTERS IN SUPERVISORY SIGNAL PATHS OF AN OPTICAL TRANSPORT SYSTEM

BACKGROUND

Field

The present disclosure relates to optical communication equipment and, more specifically but not exclusively, to the use of band-pass filters in supervisory signal paths of an optical transport system.

Description of the Related Art

This section introduces aspects that may help facilitate a better understanding of the disclosure. Accordingly, the statements of this section are to be read in this light and are not to be understood as admissions about what is in the prior art or what is not in the prior art.

Subsea network operators are facing a fast growth in bandwidth demand, in part due to the development and deployment of cloud-based services. As a result, they need to optimize the capacity and performance of their fiber-optic cable plants to enable the corresponding networks to efficiently handle the increasing data flows. Due to this need, one of the requirements to telecom equipment manufacturers is to provide the network operator(s) with a supervisory system that can be used to monitor the status of the submerged plant elements, e.g., to guarantee fault detection and diagnostics, improved maintainability, good performance characteristics throughout the plant's lifespan, upgradable capacity, and/or any other pertinent benchmarks. It is also desirable for the supervisory system to be amenable to a low-cost implementation.

SUMMARY OF SOME SPECIFIC EMBODIMENTS

At least some of the above-indicated problems in the state of the art are addressed by various embodiments of a bidirectional optical repeater having two unidirectional optical amplifiers and a supervisory optical circuit connected to optically couple the optical ports thereof. In an example embodiment, the supervisory optical circuit provides one or more pathways therethrough for supervisory optical signals, each of these pathways having located therein a respective narrow band-pass optical filter. The supervisory optical circuit further provides one or more pathways therethrough configured to bypass the corresponding narrow band-pass optical filters in a manner that enables backscattered light of substantially any wavelength to cross into the optical path that has therein the unidirectional optical amplifier directionally aligned with the propagation direction of the backscattered light.

In some embodiments, the optical pathways through the supervisory optical circuit for the supervisory optical signals and for the backscattered light can be independent of each other. This particular feature of a disclosed supervisory optical circuit can advantageously be used, e.g., to separately and independently control, in a relatively straightforward manner, the attenuation therein of the backscattered light and of the supervisory optical signals.

According to an example embodiment, provided is an apparatus comprising: a first optical amplifier located in a first optical path and configured to amplify optical signals transmitted in a first direction; a second optical amplifier located in a second optical path and configured to amplify optical signals transmitted in a second direction, the second direction being opposite to the first direction; and an optical circuit connected to optically couple an optical output port of the first optical amplifier and a first optical port of the second optical amplifier; and wherein an optical connection, through the optical circuit, between the optical output port of the first optical amplifier and the first optical port of the second optical amplifier comprises: a first optical pathway configured to direct light traveling in the first direction at the optical output port of the first optical amplifier to the first optical port of the second optical amplifier in a manner that causes the light so directed to travel in the second direction at the first optical port of the second optical amplifier; and a second optical pathway configured to direct light traveling in the second direction at the optical output port of the first optical amplifier to the first optical port of the second optical amplifier in a manner that causes the light so directed to travel in the second direction at the first optical port of the second optical amplifier; wherein the first optical pathway includes a first narrow band-pass optical filter located therein; and wherein the second optical pathway is configured to bypass the first narrow band-pass optical filter.

According to another example embodiment, provided is a communication method, comprising the steps of: configuring a first optical amplifier located in a first optical path to amplify optical signals transmitted in a first direction; configuring a second optical amplifier located in a second optical path to amplify optical signals transmitted in a second direction, the second direction being opposite to the first direction; and connecting an optical circuit to optically couple an optical output port of the first optical amplifier and a first optical port of the second optical amplifier; and wherein the step of connecting comprises the sub-steps of: providing a first optical pathway configured to direct light traveling in the first direction at the optical output port of the first optical amplifier to the first optical port of the second optical amplifier in a manner that causes the light so directed to travel in the second direction at the first optical port of the second optical amplifier; and providing a second optical pathway configured to direct light traveling in the second direction at the optical output port of the first optical amplifier to the first optical port of the second optical amplifier in a manner that causes the light so directed to travel in the second direction at the first optical port of the second optical amplifier; wherein the first optical pathway includes a first narrow band-pass optical filter located therein; and wherein the second optical pathway is configured to bypass the first narrow band-pass optical filter.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Some embodiments may benefit from the use of features disclosed in European Patent Application Nos. EP17305569.0 and EP17305570.8, both filed on 17 May 2017, which applications are incorporated herein by reference in their entirety.

Figure 1:
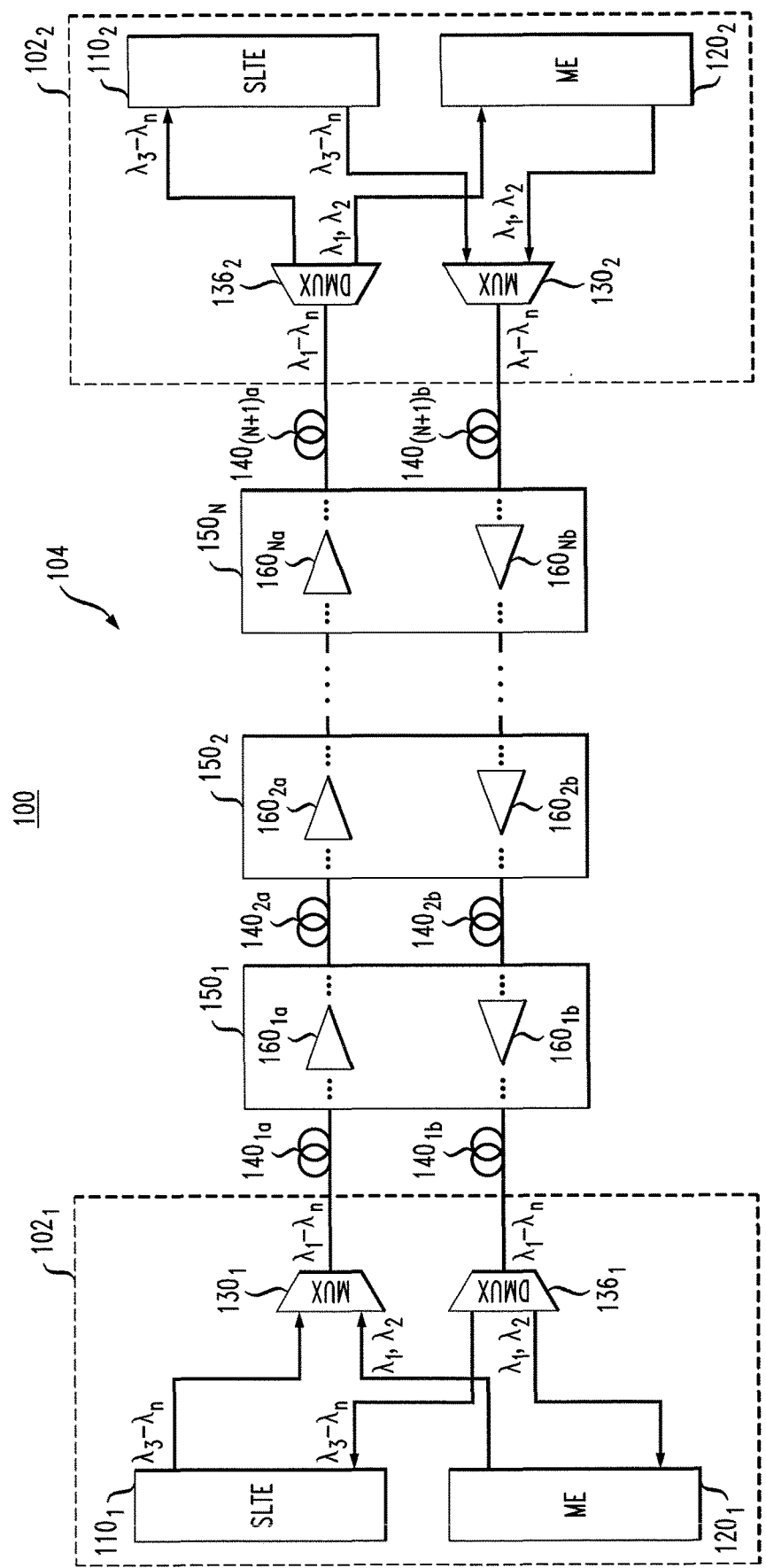
FIG. 1 shows a block diagram of an optical transport system according to an embodiment.

FIG. 1 shows a block diagram of an optical transport system 100 according to an embodiment. In the shown embodiment, system 100 comprises landing stations $102_1$ and $102_2$ connected by way of a wet plant 104. Landing stations $102_1$ and $102_2$ are typically further connected to respective terrestrial networks (not explicitly shown in FIG. 1). In an alternative embodiment, system 100 may have additional landing stations connected to wet plant 104, as known in the pertinent art, e.g., using one or more branching units (not explicitly shown in FIG. 1).

In an example embodiment, wet plant 104 comprises an undersea cable system that includes, inter alia, submersible optical repeaters $150_1$-$150_N$ serially connected by spans 140 of optical fiber, e.g., as indicated in FIG. 1, where N is a positive integer. In the shown embodiment, each span $140_i$ includes two optical fibers, which are labeled $140_{ia}$ and $140_{ib}$, respectively, where i=1, 2, . . . , N+1. The number N of optical repeaters 150 used in wet plant 104 depends on the particular embodiment and may be in the range, e.g., from 1 to ~200. A typical length of a fiber span $140_i$ may range from ~75 km to ~100 km, depending on the distance between landing stations $102_1$ and $102_2$.

In the shown embodiment, an optical repeater $150_j$ comprises optical amplifiers $160_{ja}$ and $160_{jb}$, where j=a, 2, . . . , N. Optical amplifier $160_{ja}$ is configured to amplify optical signals traveling towards landing station $102_2$. Optical amplifier $160_{jb}$ is similarly configured to amplify optical signals traveling towards landing station $102_1$. In an example embodiment, an optical amplifier $160_j$ can be implemented as known in the pertinent art, e.g., using an erbium-doped fiber, a gain-flattening filter, and one or more laser-diode pumps. The laser diodes can be powered by a DC current from the corresponding shore-based power-feeding equipment (PFE, not explicitly shown in FIG. 1), fed through the center conductor(s) of the corresponding submarine cable, which also typically contains optical fibers $140_{1a}$ and $140_{1b}$.

In an alternative embodiment, optical repeaters 150 can be designed for two, three, four, or more pairs of optical fibers $140_i$ connected thereto at each side thereof. For example, an optical repeater 150 designed to be compatible with a four-fiber-pair submarine cable typically includes eight optical amplifiers 160 arranged in four amplifier pairs, each pair being similar to optical amplifiers $160_{ja}$ and $160_{jb}$.

Optical repeater $150_j$ further comprises a supervisory optical circuit (not explicitly shown in FIG. 1) that enables monitoring equipment (ME) units $120_1$ and $120_2$ located at landing stations $102_1$ and $102_2$, respectively, to monitor the operating status of the optical repeaters, e.g., as further described below. Example embodiments of the supervisory optical circuit that can be used in optical repeater $150_j$ are described in more detail below in reference to FIGS. 2-8.

In an example embodiment, each of ME units $120_1$ and $120_2$ is configured to use dedicated supervisory wavelengths (labeled $\lambda_1$ and $\lambda_2$) to generate respective supervisory signals that can be sent through the corresponding fiber(s) 140 towards the remote landing station 102. The supervisory optical circuit of each optical repeater $150_j$ is configured to loop back, in the opposite direction, at least a portion of a supervisory signal. As a result, ME unit $120_1$ can receive a looped-back supervisory signal comprising the portions of the original supervisory signal returned to that ME unit by the different supervisory optical circuits of different optical repeaters $150_1$-$150_N$. Similarly, ME unit $120_2$ can receive a looped-back supervisory signal comprising the portions of the corresponding supervisory signal returned to that ME unit by the different supervisory optical circuits of different optical repeaters $150_1$-$150_N$. The looped-back supervisory signals received by ME units $120_1$ and $120_2$ can be processed and analyzed to determine the present operating status and/or certain operating characteristics of at least some or all of optical repeaters $150_1$-$150_N$ in wet plant 104. The determined parameters may include but are not limited to: (i) input and output signal levels and the gains of some or all individual optical amplifiers $160_{ja}$ and $160_{jb}$; (ii) non-catastrophic faults in individual optical fibers $140_i$, such as any gradual loss increases therein; and (iii) catastrophic failures in individual optical repeaters $150_j$ and/or optical fibers $140_i$.

Landing station $102_1$ comprises a submarine line terminal equipment (SLTE) unit $110_1$ and ME unit $120_1$ connected to wet plant 104 by way of a wavelength multiplexer (MUX) $130_1$ and a wavelength de-multiplexer (DMUX) $136_1$ as indicated in FIG. 1. In an example embodiment, SLTE unit $110_1$ includes a wavelength-division-multiplexing (WDM) transceiver (not explicitly shown in FIG. 1) configured to transmit and receive payload-carrying optical signals using carrier wavelengths $\lambda_3$-$\lambda_n$, where n generally denotes the number of WDM channels in system 100. The number n can be in the range between ~10 and ~150.

As already indicated above, carrier wavelengths $\lambda_1$ and $\lambda_2$ are reserved for supervisory signals and are not used by SLTE unit 110 for payload transmissions. Carrier wavelengths $\lambda_1$ and $\lambda_2$ can be spectrally located at an edge of the spectral range occupied by the payload-carrying WDM channels. For example, in some embodiments, both carrier wavelengths $\lambda_1$ and $\lambda_2$ can be smaller than any of carrier wavelengths $\lambda_3$-$\lambda_n$. In some other embodiments, both carrier wavelengths $\lambda_1$ and $\lambda_2$ can be larger than any of carrier wavelengths $\lambda_3$-$\lambda_n$. In some alternative embodiments, carrier wavelength $\lambda_1$ can be smaller than any of carrier wavelengths $\lambda_3$-$\lambda_n$, and carrier wavelength $\lambda_2$ can be larger than any of carrier wavelengths $\lambda_3$-$\lambda_n$.

In an example embodiment, carrier wavelengths $\lambda_1$-$\lambda_1$ can be selected in accordance with a frequency (wavelength) grid, such as a frequency grid that complies with the ITU-T G.694.1 Recommendation, which is incorporated herein by reference in its entirety. The frequency grid used in system 100 can be defined, e.g., in the frequency range from about 184 THz to about 201 THz, with a 100, 50, 25, or 12.5-GHz spacing of the channels therein.

While typically defined in frequency units, the parameters of the grid can equivalently be expressed in wavelength units. For example, in the wavelength range from about 1528 nm to about 1568 nm, the 100-GHz spacing between the centers of neighboring WDM channels is equivalent to approximately 0.8-nm spacing. In alternative embodiments, other fixed or flexible (flex) frequency grids can be used as well.

In operation, MUX $130_1$ multiplexes the optical signals of carrier wavelengths $\lambda_3$-$\lambda_n$ generated by SLTE unit $110_1$ and the supervisory optical signals of carrier wavelengths $\lambda_1$ and $\lambda_2$, and applies the resulting multiplexed optical signal to optical fiber $140_{1a}$. DMUX $136_1$ de-multiplexes a multiplexed optical signal received from optical fiber $140_{1b}$ into two portions. The first portion has optical signals of carrier wavelengths $\lambda_3$-$\lambda_n$ and is directed to SLTE unit $110_1$. The second portion has the looped-back supervisory optical signals of carrier wavelengths $\lambda_1$ and $\lambda_2$ and is directed to ME unit $120_1$.

In an example embodiment, ME unit $120_1$ comprises an optical time-domain reflectometer (OTDR, not explicitly shown in FIG. 1) configured to optically probe wet plant 104 using carrier wavelengths $\lambda_1$ and $\lambda_2$. For example, ME unit $120_1$ can be designed to perform OTDR measurements by detecting and processing the looped-back supervisory optical signals received from optical repeaters $150_1$-$150_N$. In general, ME unit $120_1$ can be configured to use any suitable OTDR method. Some embodiments of ME unit $120_1$ may benefit from the use of at least some OTDR features and/or techniques disclosed, e.g., in U.S. Pat. Nos. 9,341,543, 9,310,274, 9,240,836, 9,170,173, 9,143,228, 9,042,721, 9,036,991, 9,008,503, 8,942,556, 8,837,938, 8,805,183, 8,502,964, and 8,280,253 and U.S. Patent Application Publication Nos. 2011/0216996, 2013/0216176, and 2014/0212130, all of which are incorporated herein by reference in their entirety. The general physical principles of different types of OTDR measurements are reviewed, e.g., in Xiaoyi Bao and Liang Chen, "Recent Progress in Distributed Fiber Optic Sensors," Sensors, 2012, vol. 12, pp. 8601-8639, which is also incorporated herein by reference in its entirety.

Landing station $102_2$ is analogous to landing station $102_1$ and comprises an SLTE unit $110_2$, ME unit $120_2$, a MUX $130_2$, and a DMUX $136_2$. The analogous elements/components of the two landing stations are labeled in FIG. 1 using the same numerical labels, but with different respective subscripts. The descriptions of SLTE unit $110_1$, ME unit $120_1$, MUX $130_1$, and DMUX $136_1$ of landing station $102_1$ given above generally apply to SLTE unit $110_2$, ME unit $120_2$, MUX $130_2$, and DMUX $136_2$, respectively, of landing station $102_2$ and are not repeated here.

In various embodiments, each of landing stations $102_1$ and $102_2$ may further include one or more of the following conventional elements/components: (i) power feeding equipment; (ii) system supervisory equipment; (iii) network management equipment; (iv) cable termination boxes; (v) network protection equipment; and (vi) various interface circuits.

In some embodiments, a single respective carrier wavelength can be used at each of ME units $120_1$ and $120_2$ to generate supervisory optical signals. In some other embodiments, more than two carrier wavelengths of the WDM set $\lambda_1$-$\lambda_n$ can be allocated for supervisory functions. A person of ordinary skill in the art will understand, without undue experimentation, how to modify MUXes 130, DMUXes 136, and/or other pertinent system components to be compatible with such alternative WDM-channel allocations for supervisory functions.

In an example embodiment, a supervisory optical circuit of optical repeater $150_j$ is implemented using narrow band-pass optical filters (NBPOFs, not explicitly shown in FIG. 1, see FIGS. 2-8).

As used herein the term "narrow band-pass optical filter" refers to an optical device that passes optical frequencies (wavelengths) within a certain relatively narrow range and rejects (or strongly attenuates) optical frequencies outside that range. The bandwidth B of the narrow band-pass optical filter is much smaller than any of the carrier frequencies that are being passed therethrough. For example, a center frequency of the pass band can be ~200 THz, whereas the bandwidth B can be ~100 GHz, which is approximately three orders of magnitude smaller.

The planar-lightwave-circuit (PLC) technology enables telecom equipment manufacturers to produce narrow band-pass optical filters in large quantities and/or relatively inexpensively. There are many mature filter designs from which the manufacturer can choose for the intended application. In addition, a PLC-based narrow band-pass optical filter can be made tunable in a relatively straightforward manner, without an expensive and/or time-consuming redesign.

Various embodiments disclosed herein can beneficially leverage some of these and other technical features of narrow band-pass optical filters to provide a supervisory optical circuit for optical repeater $150_j$ that is capable of meeting and/or exceeding the operating requirements of network operator(s) and is amenable to low-cost implementation. In addition, at least some of the disclosed embodiments can beneficially provide significant flexibility in the manner in which supervisory optical circuits can be designed and/or operated.

Figure 2A:
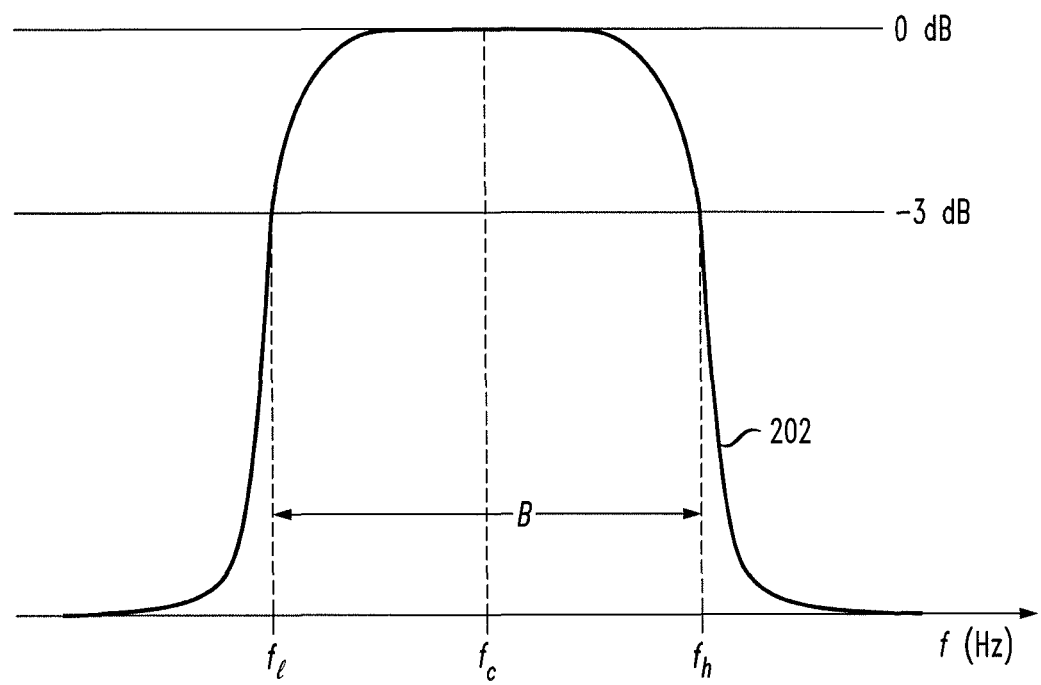
FIGS. 2A-2B graphically illustrate certain spectral characteristics of an example narrow band-pass optical filter that can be used in a supervisory optical circuit of an optical repeater of the optical transport system of FIG. 1 according to an embodiment.
Figure 2B:
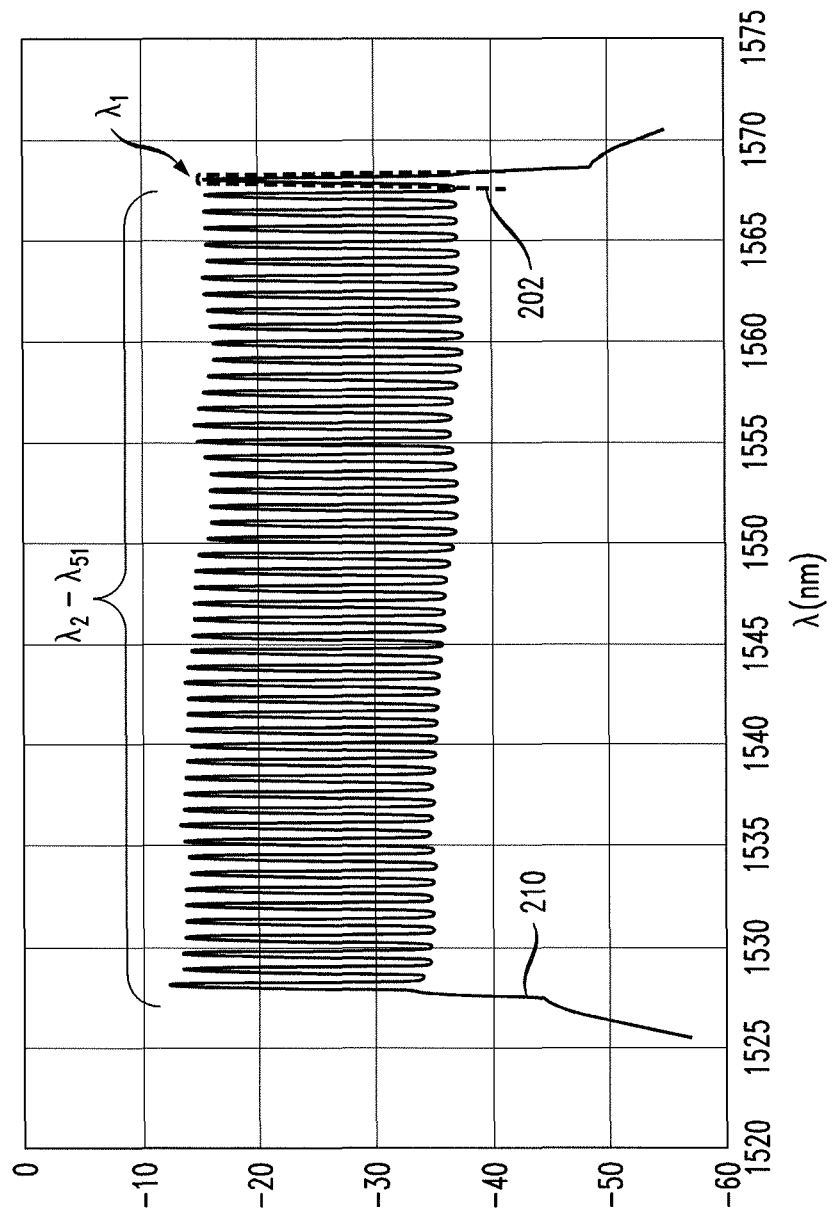

FIGS. 2A-2B graphically illustrate certain spectral characteristics of an example narrow band-pass optical filter that can be used in the supervisory optical circuit of optical repeater 150 according to an embodiment. More specifically, FIG. 2A graphically shows a magnitude transfer function 202 versus frequency for a narrow band-pass optical filter. FIG. 2B graphically shows the spectral alignment of transfer function 202 with a spectrum 210 of an example WDM signal that can be used in system 100.

Referring to FIG. 2A, marked on the abscissa are (i) the center frequency $f_c$ of transfer function 202 and (ii) the frequencies $f_i$ and $f_h$ of the half-power points (gain −3 dB relative to the center portion) of transfer function 202. The bandwidth B of transfer function 202 can typically be defined as the difference between the frequencies $f_h$ and $f_l$, although an alternative definition is also possible.

Depending on the embodiment, the bandwidth B can be, e.g., 100, 50, 25, or 12.5 GHz. Other values of the bandwidth B can also be used, as long as the selected bandwidth value is compatible with the system's WDM configuration and/or WDM-channel assignment, e.g., as further illustrated in FIG. 2B.

The center frequency $f_c$ can belong to any telecom band. As known to those skilled in the pertinent art, the frequencies (wavelengths) used for optical communications are conventionally divided into several spectral bands in which optical fibers have relatively low transmission losses. For example, the spectral range between 1260 nm and 1625 nm is divided into five telecom bands that are typically referred to as O-, E-, S-, C-, and L-bands. The O-band is in the wavelength range between 1260 nm and 1360 nm. The E-band is in the wavelength range between 1360 nm and 1460 nm. The S-band is in the wavelength range between 1460 nm and 1530 nm. The C-band is in the wavelength range between 1530 nm and 1565 nm. The L-band is in the wavelength range between 1565 nm and 1625 nm.

Referring to FIG. 2B, spectrum 210 has fifty-one peaks corresponding to carrier wavelengths $\lambda_1$-$\lambda_{51}$ (i.e., n=51). Transfer function 202 is illustratively shown as being spectrally aligned with the peak corresponding to carrier wavelength $\lambda_1$, which is one of the dedicated supervisory wavelengths in system 100 (see FIG. 1). The center frequency $f_c$ and bandwidth B of transfer function 202 are such that a supervisory optical signal having carrier wavelength $\lambda_1$ can pass through the corresponding narrow band-pass optical filter with little attenuation, whereas any of the optical signals having carrier wavelengths $\lambda_2$-$\lambda_{51}$ is rejected or significantly attenuated due to being outside of the bandwidth B.

A person of ordinary skill in the art will understand that a narrow band-pass optical filter corresponding to any of the additional dedicated supervisory wavelengths (e.g., $\lambda_2$, FIG. 1) can similarly be spectrally aligned with the peak corresponding to that carrier wavelength in spectrum 210.

In an example embodiment, any of the narrow band-pass optical filters used in supervisory optical circuits disclosed herein can be implemented as a part of the corresponding planar lightwave circuit. In a typical design, such a narrow band-pass optical filter does not employ a mirror configured to reflect, in an opposite direction, light applied to the filter by the corresponding supervisory optical circuit, e.g., if the light has a carrier frequency between $f_h$ and $f_l$ (see FIG. 2A). As used herein, the term "mirror" should be construed to cover, inter alia, conventional broadband mirrors, wavelength-selective reflectors, and Bragg reflectors.

Figure 3:
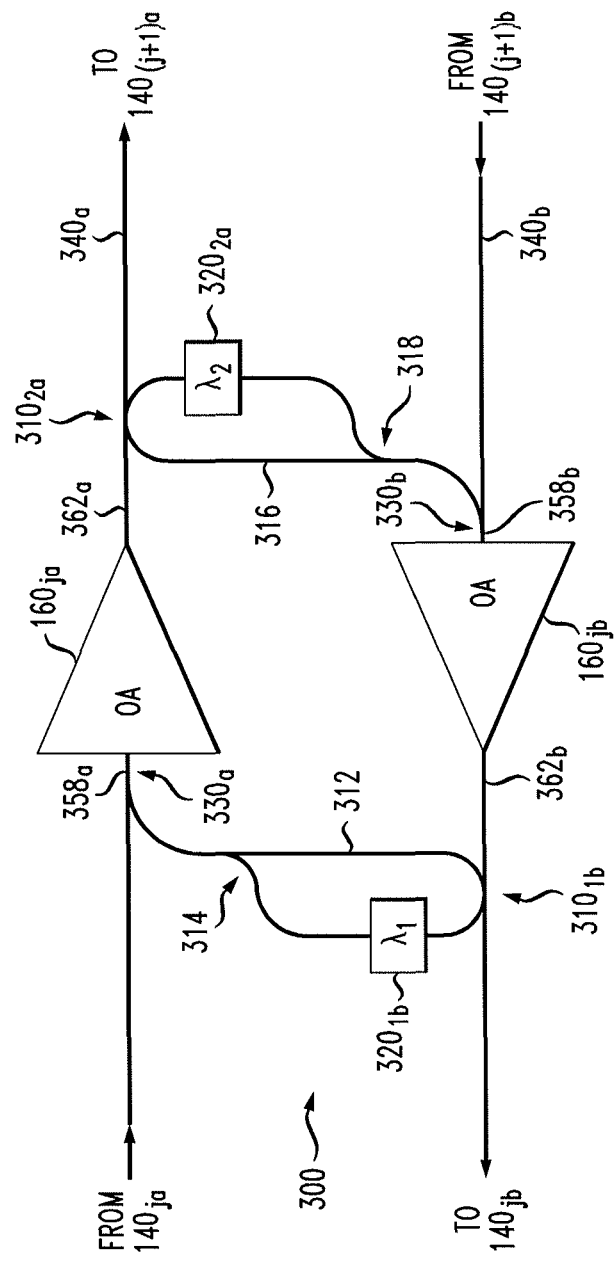
FIG. 3 shows a block diagram of an optical repeater that can be used in the optical transport system of FIG. 1 according to an embodiment.

FIG. 3 shows a block diagram of an optical repeater 150$_j$ according to an embodiment. Connections of optical repeater 150$_j$ to optical fibers 140$_{ja}$, 140$_{jb}$, 140$_{(j+1)a}$, and 140$_{(j+1)b}$ Of wet plant 104 are also shown in FIG. 3 to better indicate the relationship between the optical circuits of FIGS. 1 and 3. Optical amplifier (OA) 160$_{ja}$ of optical repeater 150$_j$ (also see FIG. 1) is located in an optical path 340$_a$ that connects optical fibers 140$_{ja}$ and 140$_{(j+1)a}$. Similarly, optical amplifier (OA) 160$_{jb}$ of optical repeater 150$_j$ (also see FIG. 1) is located in an optical path 340$_b$ that connects optical fibers 140$_{jb}$ and 140$_{(j+1)b}$. Optical repeater 150$_j$ also includes a supervisory optical circuit 300 that optically couples optical paths 340$_a$ and 340$_b$ as described in more detail below.

Circuit 300 comprises (i) two 2×2 optical couplers that are labeled in FIG. 3 as 310$_{1b}$ and 310$_{2a}$, respectively, and (ii) four 2×1 optical couplers that are labeled in FIG. 3 as 314, 318, 330$_a$, and 330$_b$, respectively. Optical coupler 310$_{2a}$ is located on optical path 340$_a$ at an output port 362$_a$ of optical amplifier 160$_{ja}$. Optical coupler 310$_{1b}$ is located on optical path 340$_b$ at an output port 362$_b$ of optical amplifier 160$_{jb}$. Optical coupler 330$_a$ is located at input port 358$_a$ of optical amplifier 160$_{ja}$. Optical coupler 330$_b$ is located at input port 358$_b$ of optical amplifier 160$_{jb}$. Optical coupler 310$_{1b}$ and optical coupler 330$_a$ are connected to one another by way of an optical fiber or waveguide 312. Optical coupler 310$_{2a}$ and optical coupler 330$_b$ are connected to one another by way of an optical fiber or waveguide 316.

Optical coupler 314 is inserted into optical fiber or waveguide 312 to provide a parallel optical path between optical couplers 310$_{1b}$ and 330$_a$, the parallel optical path comprising an NBPOF 320$_{1b}$. The transfer function 202 of NBPOF 320$_{1b}$ has the center frequency $f_c$ corresponding to wavelength $\lambda_1$.

Optical coupler 318 is similarly inserted into optical fiber or waveguide 316 to provide a parallel optical path between optical couplers 310$_{2a}$ and 330$_b$, the parallel optical path comprising an NBPOF 320$_{2a}$. The transfer function 202 of NBPOF 320$_{2a}$ has the center frequency $f_c$ corresponding to wavelength $\lambda_2$.

In an example embodiment, circuit 300 can be a planar lightwave circuit or a part of a planar lightwave circuit.

In operation, circuit 300 provides the following loop-back paths for the supervisory optical signals of carrier wavelengths $\lambda_1$ and $\lambda_2$.

A portion of a supervisory optical signal of carrier wavelength $\lambda_2$ received from optical fiber 140$_{ja}$ can be looped back into optical fiber 140$_{jb}$, e.g., as follows. Optical path 340$_a$ directs the optical signal received through optical fiber 140$_{ja}$ to optical amplifier 160$_{ja}$, where the latter undergoes optical amplification. The resulting amplified signal is directed from output port 362$_a$ of optical amplifier 160$_{ja}$ to optical coupler 310$_{2a}$. Optical coupler 310$_{2a}$ operates to cause the coupled optical signal to be directed through NBPOF 320$_{2a}$ that passes the $\lambda_2$ component thereof and essentially stops all other spectral components thereof. The filtered $\lambda_2$ component is coupled by optical coupler 318 into optical fiber 316, which directs it to optical amplifier 160$_{jb}$ by way of optical coupler 330$_b$. The resulting amplified signal of carrier wavelength $\lambda_2$ is then directed from output port 362$_b$ of optical amplifier 160$_{jb}$ to optical fiber 140$_{jb}$.

A portion of a supervisory optical signal of carrier wavelength $\lambda_1$ received from optical fiber 140$_{(j+1)b}$ can be looped back into optical fiber 140$_{(j+1)a}$, e.g., as follows. Optical path 340$_b$ directs the optical signal received through optical fiber 140$_{(j+1)b}$ to optical amplifier 160$_{jb}$, where the latter undergoes optical amplification. The resulting amplified signal is directed from output port 362$_b$ of optical amplifier 160$_{jb}$ to optical coupler 310$_{1b}$. Optical coupler 310$_{1b}$ operates to cause the coupled optical signal to be directed through NBPOF 320$_{1b}$ that passes the $\lambda_1$ component thereof and essentially stops all other spectral components thereof. The filtered $\lambda_1$ component is coupled by optical coupler 314 into optical fiber 312, which directs it to optical amplifier 160$_{ja}$ by way of optical coupler 330$_a$. The resulting amplified signal of carrier wavelength $\lambda_1$ is then directed from output port 360$_a$ of optical amplifier 160$_{ja}$ to optical fiber 140$_{(j+1)a}$.

In addition, circuit 300 provides (i) an optical pathway for the backscattered light to cross from optical path 340$_a$ to optical path 340$_b$ and (ii) an optical pathway for the backscattered light to cross from optical path 340$_b$ to optical path 340$_a$, both of these optical pathways being configured to bypass NBPOFs 320$_{1b}$ and 320$_{2a}$. As such, each of the latter optical pathways can be used to direct back to the corresponding one of landing stations 102$_1$ and 102$_2$ the backscattered light by way of the optical path having the optical amplifiers 160 that are directionally aligned with the propagation direction of the backscattered light. The backscattered light so directed can be of any suitable wavelength, e.g., have one of carrier wavelengths $\lambda_3$-$\lambda_n$ or any out-of-band wavelength, such as a wavelength corresponding to a different telecom band than that of wavelengths $\lambda_1$-$\lambda_n$.

For example, optical fiber or waveguide 316 is configured to direct backscattered light received from optical fiber 140$_{(j+1)a}$ to input port 358$_b$ of optical amplifier 160$_{jb}$ such that the received backscattered light bypasses NBPOF 320$_{2a}$. Optical fiber or waveguide 312 is similarly configured to direct backscattered light received from optical fiber 140$_{jb}$ to input port 358$_a$ of optical amplifier 160$_{ja}$ such that the received backscattered light bypasses NBPOF 320$_{1b}$. A person of ordinary skill in the art will understand that the capability for efficiently channeling the backscattered light towards the source of the original optical signal that is being backscattered can advantageously be used, e.g., to expand the monitoring capabilities of landing stations $102_1$ and $102_2$ beyond the above-described capabilities of ME units 120.

As known in the pertinent art, the backscattered light can be generated by a number of physical mechanisms, such as (i) a catastrophic defect in the optical fiber; (ii) a relatively large temperature gradient along the length of the optical fiber; (iii) a non-catastrophic defect that might be caused by sheering, stressing, shaking, and/or excessive bending of the optical fiber; etc.

Example optical-link monitoring (OLM) functions that can be implemented using the backscattered light channeled through optical fibers or waveguides 312 and 316 can be based on one or more of the following approaches.

In some embodiments, a landing station 102 can be designed and configured to perform OTDR measurements in a normal operating mode, e.g., by detecting and processing reflected and/or backscattered optical signals having carrier wavelengths $\lambda_3$-$\lambda_n$. Alternatively or in addition, a landing station 102 can be designed and configured to perform OTDR measurements in a special OLM operating mode, during which the corresponding transceiver generates and applies to wet plant 104 a modulated optical signal with a waveform that facilitates OTDR measurements, e.g., in terms of providing a higher signal-to-noise ratio (SNR) and/or a better spatial resolution for OTDR measurements than those technically achievable with payload-carrying optical signals. Transmission of payload data may be temporarily halted while landing station 102 is in the OLM operating mode and may be resumed when the corresponding transceiver is switched back to the normal operating mode.

In different embodiments, the above-mentioned OLM functions can be based on different types of OTDR measurements. For example, in one possible embodiment, landing station 102 can be designed and configured to perform OTDR measurements by detecting and processing the elastically reflected light and/or backscattered light produced due to Rayleigh scattering in wet plant 104. In another possible embodiment, landing station 102 can be designed and configured to perform OTDR measurements by detecting and processing the backscattered light produced due to Brillouin scattering in wet plant 104. In yet another possible embodiment, landing station 102 can be designed and configured to perform OTDR measurements by detecting and processing the backscattered light produced due to Raman scattering in wet plant 104. These and other embodiments may benefit from the use of at least some OTDR features and/or techniques disclosed in the above-cited U.S. Pat. Nos. 9,341,543, 9,310,274, 9,240,836, 9,170,173, 9,143,228, 9,042,721, 9,036,991, 9,008,503, 8,942,556, 8,837,938, 8,805,183, 8,502,964, and 8,280,253 and U.S. Patent Application Publication Nos. 2011/0216996, 2013/0216176, and 2014/0212130.

Figure 4:
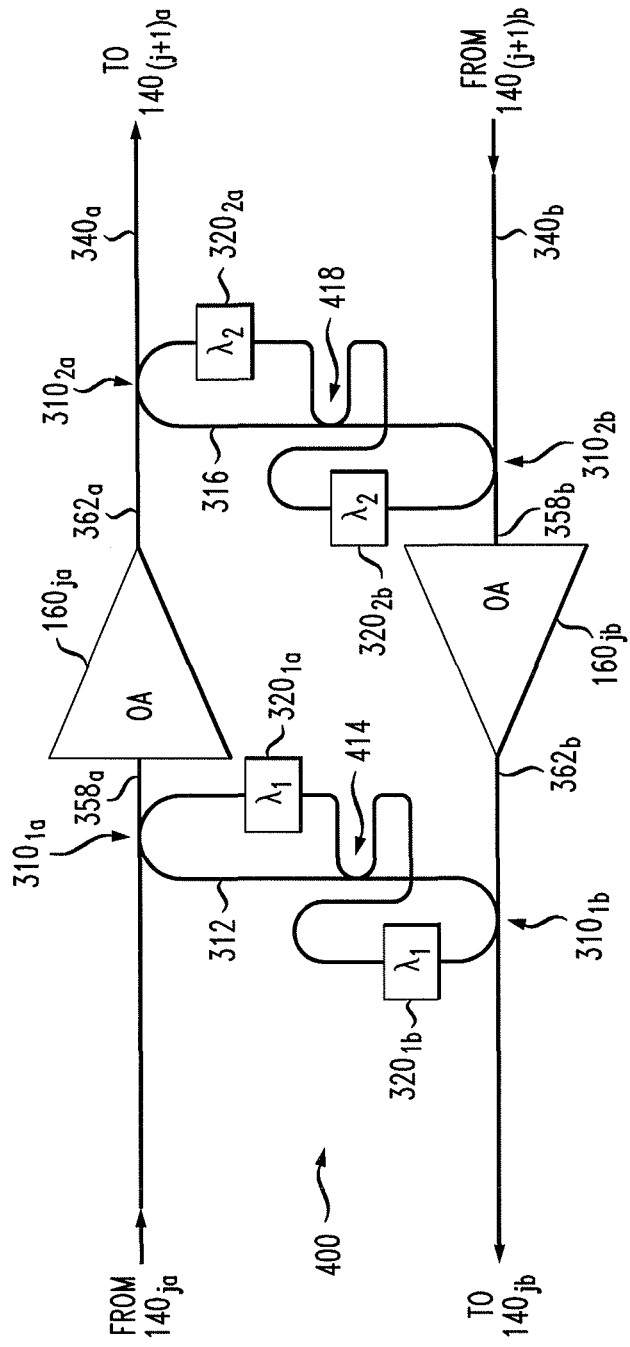
FIG. 4 shows a block diagram of an optical repeater that can be used in the optical transport system of FIG. 1 according to another embodiment.

FIG. 4 shows a block diagram of an optical repeater 150 according to another embodiment. Connections of optical repeater $150_j$ to optical fibers $140_{ja}$, $140_{jb}$, $140_{(j+1)a}$, and $140_{(j+1)b}$ of wet plant 104 are also shown in FIG. 4 to better indicate the relationship between the optical circuits of FIGS. 1 and 4.

The embodiment of optical repeater $150_j$ shown in FIG. 4 is generally similar to the embodiment of optical repeater $150_j$ shown in FIG. 3, and the two embodiments use many of the same components, which are labeled in FIGS. 3 and 4 using the same labels. These components are already described above in reference to FIG. 3, and their description is not repeated here. Instead, the description given below primarily focuses on the differences between the embodiments of FIGS. 3 and 4.

In the embodiment of optical repeater $150_j$ shown in FIG. 4, supervisory optical circuit 300 is replaced by a supervisory optical circuit 400. Circuit 400 differs from circuit 300 as follows:
 (i) 2×1 optical couplers $330_a$ and $310_b$ are replaced by 2×2 optical couplers $310_{1a}$ and $310_{2b}$, respectively;
 (ii) 2×1 optical couplers 314 and 318 are replaced by 2×2 optical couplers 414 and 418, respectively; and
 (iii) NBPOFs $320_{2b}$ and $320_{1a}$ are added and connected as indicated in FIG. 4.

In an example embodiment, the added NBPOFs $320_{2b}$ and $320_{1a}$ can be nominal copies of NBPOFs $320_{2a}$ and $320_{1b}$, respectively.

In operation, circuit 400 provides the following loop-back paths for the supervisory optical signals of carrier wavelengths $\lambda_1$ and $\lambda_2$.

A portion of a supervisory optical signal of carrier wavelength $\lambda_1$ received from optical fiber $140_{ja}$ can be looped back into optical fiber $140_{jb}$, e.g., as follows. Optical path $340_a$ directs the optical signal received through optical fiber $140_{ja}$ to optical coupler $310_{1a}$. Optical coupler $310_{1a}$ operates to cause the coupled optical signal to be directed through NBPOF $320_{1a}$ that passes the $\lambda_1$ component thereof and essentially stops all other spectral components thereof. The filtered $\lambda_1$ component is coupled by optical coupler 414 into optical fiber 312, which directs it to optical fiber $140_{jb}$ by way of optical coupler $310_{1b}$.

A portion of a supervisory optical signal of carrier wavelength $\lambda_2$ received from optical fiber $140_{ja}$ can be looped back into optical fiber $140_{jb}$, e.g., as follows. Optical path $340_a$ directs the optical signal received through optical fiber $140_{ja}$ to optical amplifier $160_{ja}$, where the latter undergoes optical amplification. The resulting amplified signal is directed from output port $362_a$ of optical amplifier $160_{ja}$ to optical coupler $310_{2a}$. Optical coupler $310_{2a}$ operates to cause the coupled optical signal to be directed through NBPOF $320_{2a}$ that passes the $\lambda_2$ component thereof and essentially stops all other spectral components thereof. The filtered $\lambda_2$ component is coupled by optical coupler 418 into optical fiber 316, which directs it to optical amplifier $160_{jb}$ by way of optical coupler $310_{2b}$. The resulting amplified signal of carrier wavelength $\lambda_2$ is then directed from output port $362_b$ of optical amplifier $160_{jb}$ to optical fiber $140_{jb}$.

A portion of a supervisory optical signal of carrier wavelength $\lambda_2$ received from optical fiber $140_{(j+1)b}$ can be looped back into optical fiber $140_{(j+1)a}$, e.g., as follows. Optical path $340_b$ directs the optical signal received through optical fiber $140_{(j+1)b}$ to optical coupler $310_{2b}$. Optical coupler $310_{2b}$ operates to cause the coupled optical signal to be directed through NBPOF $320_{2b}$ that passes the $\lambda_2$ component thereof and essentially stops all other spectral components thereof. The filtered $\lambda_2$ component is coupled by optical coupler 418 into optical fiber 316, which directs it to optical fiber $140_{(j+1)a}$ by way of optical coupler $310_{2a}$.

A portion of a supervisory optical signal of carrier wavelength $\lambda_1$ received from optical fiber $140_{(j+1)b}$ can be looped back into optical fiber $140_{(j+1)a}$, e.g., as follows. Optical path $340_b$ directs the optical signal received through optical fiber $140_{(j+1)b}$ to optical amplifier $160_{jb}$, where the latter undergoes optical amplification. The resulting amplified signal is directed from output port $362_b$ of optical amplifier $160_{jb}$ to optical coupler $310_{1b}$. Optical coupler $310_{1b}$ operates to cause the coupled optical signal to be directed through NBPOF $320_{1b}$ that passes the $\lambda_1$ component thereof and essentially stops all other spectral components thereof. The filtered $\lambda_1$ component is coupled by optical coupler 414 into optical fiber 312, which directs it to optical amplifier $160_{ja}$ by way of optical coupler $310_{1a}$. The resulting amplified signal of carrier wavelength $\lambda_1$ is then directed from output port $362_a$ of optical amplifier $160_{ja}$ to optical fiber $140_{(j+1)a}$.

In addition, circuit 400 provides the same optical pathways for the backscattered light as circuit 300, by way of optical fibers or waveguides 312 and 316.

Figure 5:
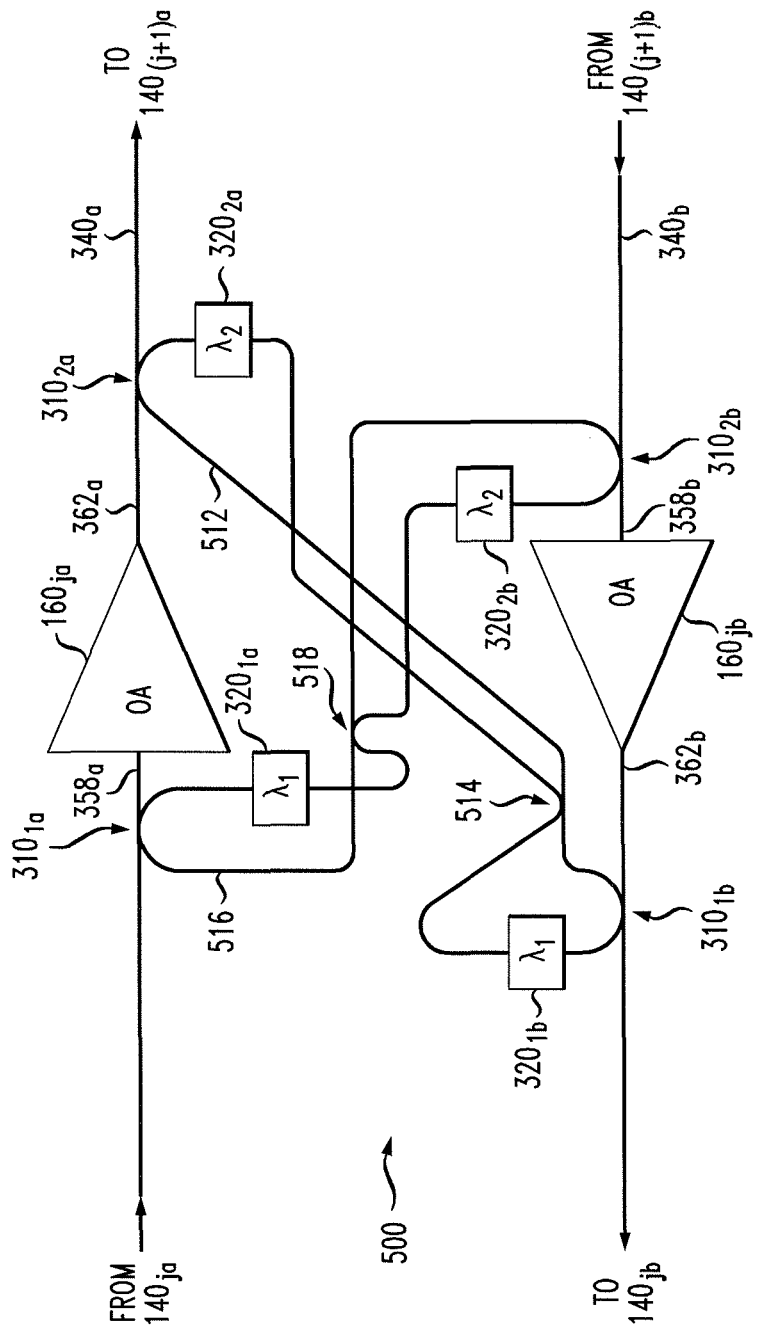
FIG. 5 shows a block diagram of an optical repeater that can be used in the optical transport system of FIG. 1 according to yet another embodiment.

FIG. 5 shows a block diagram of an optical repeater $150_j$ according to yet another embodiment. Connections of optical repeater $150_j$ to optical fibers $140_{ja}$, $140_{jb}$, $140_{(j+1)a}$, and $140_{(j+1)b}$ of wet plant 104 are also shown in FIG. 5 to better indicate the relationship between the optical circuits of FIGS. 1 and 5.

In the embodiment of optical repeater $150_j$ shown in FIG. 5, supervisory optical circuit 400 is replaced by a supervisory optical circuit 500. Circuit 500 can be obtained by modifying circuit 400 as follows:

(i) removing optical couplers 414 and 418;
(ii) removing optical fibers 312 and 316; and
(iii) reconnecting optical couplers $310_{1a}$, $310_{1b}$, $310_{2a}$, and $310_{2b}$ and NBPOFs $320_{1a}$, $320_{1b}$, $320_{2a}$, and $320_{2b}$ using optical fibers or waveguides 512 and 516, and 2×2 optical couplers 514 and 518, as indicated in FIG. 5.

The resulting structure of circuit 500 provides the following supervisory optical paths: (i) a path between input ports $358_a$ and $358_b$, with the wavelengths $\lambda_1$ and $\lambda_2$ being used in this path to carry signals in respective opposite directions; and (ii) a path between output ports $362_a$ and $362_b$, with the wavelengths $\lambda_1$ and $\lambda_2$ similarly being used in this path to carry signals in respective opposite directions.

In operation, circuit 500 provides the following loop-back paths for the supervisory optical signals of carrier wavelengths $\lambda_1$ and $\lambda_2$.

A portion of a supervisory optical signal of carrier wavelength $\lambda_1$ received from optical fiber $140_{ja}$ can be looped back into optical fiber $140_{jb}$, e.g., as follows. Optical path $340_a$ directs the optical signal received through optical fiber $140_{ja}$ to optical coupler $310_{1a}$. Optical coupler $310_{1a}$ operates to cause the coupled optical signal to be directed through NBPOF $320_{1a}$ that passes the $\lambda_1$ component thereof and essentially stops all other spectral components thereof. The filtered $\lambda_1$ component is coupled by optical coupler 518 into optical fiber 516, which directs it to input port $358_b$ of optical amplifier $160_{jb}$ by way of optical coupler $310_{2b}$. The resulting amplified signal of carrier wavelength $\lambda_1$ is then directed from output port $362_b$ of optical amplifier $160_{jb}$ to optical fiber $140_{jb}$.

A portion of a supervisory optical signal of carrier wavelength $\lambda_2$ received from optical fiber $140_{ja}$ can be looped back into optical fiber $140_{jb}$, e.g., as follows. Optical path $340_a$ directs the optical signal received through optical fiber $140_{ja}$ to optical amplifier $160_{ja}$, where the latter undergoes optical amplification. The resulting amplified signal is directed from output port $362_a$ of optical amplifier $160_{ja}$ to optical coupler $310_{2a}$. Optical coupler $310_{2a}$ operates to cause the coupled optical signal to be directed through NBPOF $320_{2a}$ that passes the $\lambda_2$ component thereof and essentially stops all other spectral components thereof. The filtered $\lambda_2$ component is coupled by optical coupler 514 into optical fiber 512, which directs it to optical fiber $140_{jb}$ by way of optical coupler $310_{1b}$.

A portion of a supervisory optical signal of carrier wavelength $\lambda_2$ received from optical fiber $140_{(j+1)b}$ can be looped back into optical fiber $140_{(j+1)a}$, e.g., as follows. Optical path $340_b$ directs the optical signal received through optical fiber $140_{(j+1)b}$ to optical coupler $310_{2b}$. Optical coupler $310_{2b}$ operates to cause the coupled optical signal to be directed through NBPOF $320_{2b}$ that passes the $\lambda_2$ component thereof and essentially stops all other spectral components thereof. The filtered $\lambda_2$ component is coupled by optical coupler 518 into optical fiber 516, which directs it to input port $358_a$ of optical amplifier $160_{ja}$ by way of optical coupler $310_{1a}$. The resulting amplified signal of carrier wavelength $\lambda_2$ is then directed from output port $362_a$ of optical amplifier $160_{ja}$ to optical fiber $140_{(j+1)a}$.

A portion of a supervisory optical signal of carrier wavelength $\lambda_1$ received from optical fiber $140_{(j+1)n}$ can be looped back into optical fiber $140_{(j+1)a}$, e.g., as follows. Optical path $340_b$ directs the optical signal received through optical fiber $140_{(j+1)b}$ to optical amplifier $160_{jb}$, where the latter undergoes optical amplification. The resulting amplified signal is directed from output port $362_b$ of optical amplifier $160_{jb}$ to optical coupler $310_{1b}$. Optical coupler $310_{1b}$ operates to cause the coupled optical signal to be directed through NBPOF $320_{1b}$ that passes the $\lambda_1$ component thereof and essentially stops all other spectral components thereof. The filtered $\lambda_1$ component is coupled by optical coupler 514 into optical fiber 512, which directs it to optical fiber $140_{(j+1)a}$ by way of optical coupler $310_{2a}$.

In addition, circuit 500 provides (i) an optical pathway, by way of optical fiber or waveguide 512, for the backscattered light to cross from optical path $340_a$ to optical path $340_b$, and (ii) an optical pathway, by way of optical fiber or waveguide 512, for the backscattered light to cross from optical path $340_b$ to optical path $340_a$, both of the latter optical pathways being configured to bypass NBPOFs $320_{1a}$, $320_{1b}$, $320_{2a}$, and $320_{2b}$.

In some embodiments, circuit 500 can be modified by removing the supervisory optical path between input ports $358_a$ and $358_b$. In some other embodiments, circuit 500 can be modified by removing the supervisory optical path between output ports $362_a$ and $362_b$.

Figure 6:
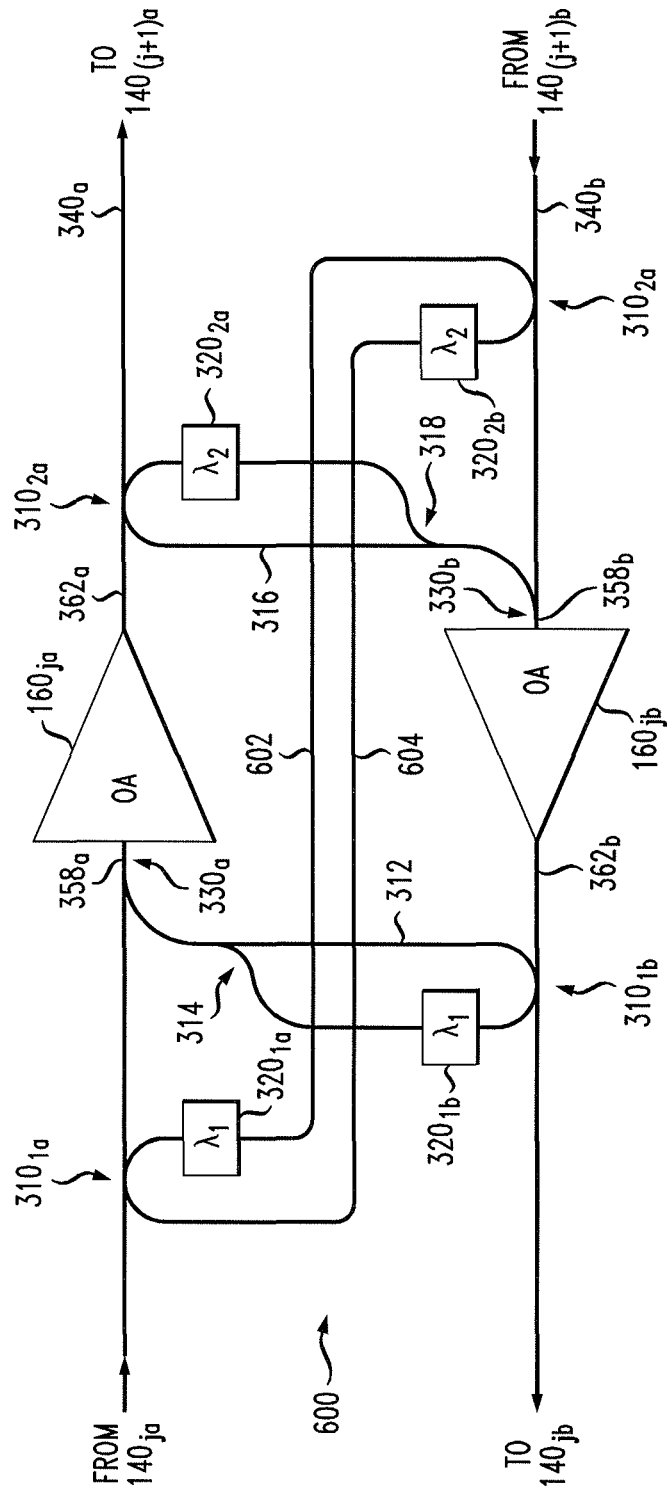
FIG. 6 shows a block diagram of an optical repeater that can be used in the optical transport system of FIG. 1 according to yet another embodiment.

FIG. 6 shows a block diagram of an optical repeater $150_j$ according to yet another embodiment. Connections of optical repeater $150_j$ to optical fibers $140_{ja}$, $140_{jb}$, $140_{(j+1)a}$, and $140_{(j+1)b}$ of wet plant 104 are also shown in FIG. 6 to better indicate the relationship between the optical circuits of FIGS. 1 and 6.

In the embodiment of optical repeater $150_j$ shown in FIG. 6, supervisory optical circuit 300 (FIG. 3) is replaced by a supervisory optical circuit 600. Circuit 600 can be obtained by adding to circuit 300 a supervisory optical path between input ports $358_a$ and $358_b$. The added supervisory optical path comprises: (i) optical couplers $310_{1a}$ and $310_{2b}$; and (ii) optical fibers or waveguides 602 and 604, all connected as indicated in FIG. 6. The added supervisory optical path is configured to use the wavelengths $\lambda_1$ and $\lambda_2$ to carry signals in respective opposite directions.

In operation, circuit 600 provides the following loop-back paths for the supervisory optical signals of carrier wavelengths $\lambda_1$ and $\lambda_2$.

A portion of a supervisory optical signal of carrier wavelength $\lambda_1$ received from optical fiber $140_{ja}$ can be looped back into optical fiber $140_{jb}$, e.g., as follows. Optical path $340_a$ directs the optical signal received through optical fiber $140_{ja}$ to optical coupler $310_{1a}$. Optical coupler $310_{1a}$ operates to cause the coupled optical signal to be directed through NBPOF $320_{1a}$ that passes the $\lambda_1$ component thereof and essentially stops all other spectral components thereof. The filtered $\lambda_1$ component is directed by optical fiber 602 to optical coupler $310_{2b}$, which further directs it to input port $358_b$ of optical amplifier $160_{jb}$. The resulting amplified signal of carrier wavelength $\lambda_1$ is then directed from output port $362_b$ of optical amplifier $160_{jb}$ to optical fiber $140_{jb}$.

A portion of a supervisory optical signal of carrier wavelength $\lambda_2$ received from optical fiber $140_{ja}$ can be looped back into optical fiber $140_{jb}$, e.g., as follows. Optical path $340_a$ directs the optical signal received through optical fiber $140_{ja}$ to optical amplifier $160_{ja}$, where the latter undergoes optical amplification. The resulting amplified signal is directed from output port $362_a$ of optical amplifier $160_{ja}$ to optical coupler $310_{2a}$. Optical coupler $310_{2a}$ operates to cause the coupled optical signal to be directed through NBPOF $320_{2a}$ that passes the $\lambda_2$ component thereof and essentially stops all other spectral components thereof. The filtered $\lambda_2$ component is coupled by optical coupler $318$ into optical fiber $316$, which directs it to optical amplifier $160_{jb}$ by way of optical coupler $330_b$. The resulting amplified signal of carrier wavelength $\lambda_2$ is then directed from output port $362_b$ of optical amplifier $160_{jb}$ to optical fiber $140_{jb}$.

A portion of a supervisory optical signal of carrier wavelength $\lambda_1$ received from optical fiber $140_{(j+1)b}$ can be looped back into optical fiber $140_{(j+1)a}$, e.g., as follows. Optical path $340_b$ directs the optical signal received through optical fiber $140_{(j+1)b}$ to optical amplifier $160_{jb}$, where the latter undergoes optical amplification. The resulting amplified signal is directed from output port $362_b$ of optical amplifier $160_{jb}$ to optical coupler $310_{1b}$. Optical coupler $310_{1b}$ operates to cause the coupled optical signal to be directed through NBPOF $320_{1b}$ that passes the $\lambda_1$ component thereof and essentially stops all other spectral components thereof. The filtered $\lambda_1$ component is coupled by optical coupler $314$ into optical fiber $312$, which directs it to optical amplifier $160_{ja}$ by way of optical coupler $330_a$. The resulting amplified signal of carrier wavelength $\lambda_1$ is then directed from output port $360_a$ of optical amplifier $160_{ja}$ to optical fiber $140_{(j+1)a}$.

A portion of a supervisory optical signal of carrier wavelength $\lambda_2$ received from optical fiber $140_{(j+1)b}$ can be looped back into optical fiber $140_{(j+1)a}$, e.g., as follows. Optical path $340_b$ directs the optical signal received through optical fiber $140_{(j+1)b}$ to optical coupler $310_{2b}$. Optical coupler $310_{2b}$ operates to cause the coupled optical signal to be directed through NBPOF $320_{2b}$ that passes the $\lambda_2$ component thereof and essentially stops all other spectral components thereof. The filtered $\lambda_2$ component is directed by optical fiber $604$ to optical coupler $310_{1a}$, which further directs it to input port $358_a$ of optical amplifier $160_{ja}$. The resulting amplified signal of carrier wavelength $\lambda_2$ is then directed from output port $362_a$ of optical amplifier $160_{ja}$ to optical fiber $140_{(j+1)a}$.

In addition, circuit $600$ provides the same optical pathways for the backscattered light as circuit $300$, by way of optical fibers or waveguides $312$ and $316$.

Figure 7:
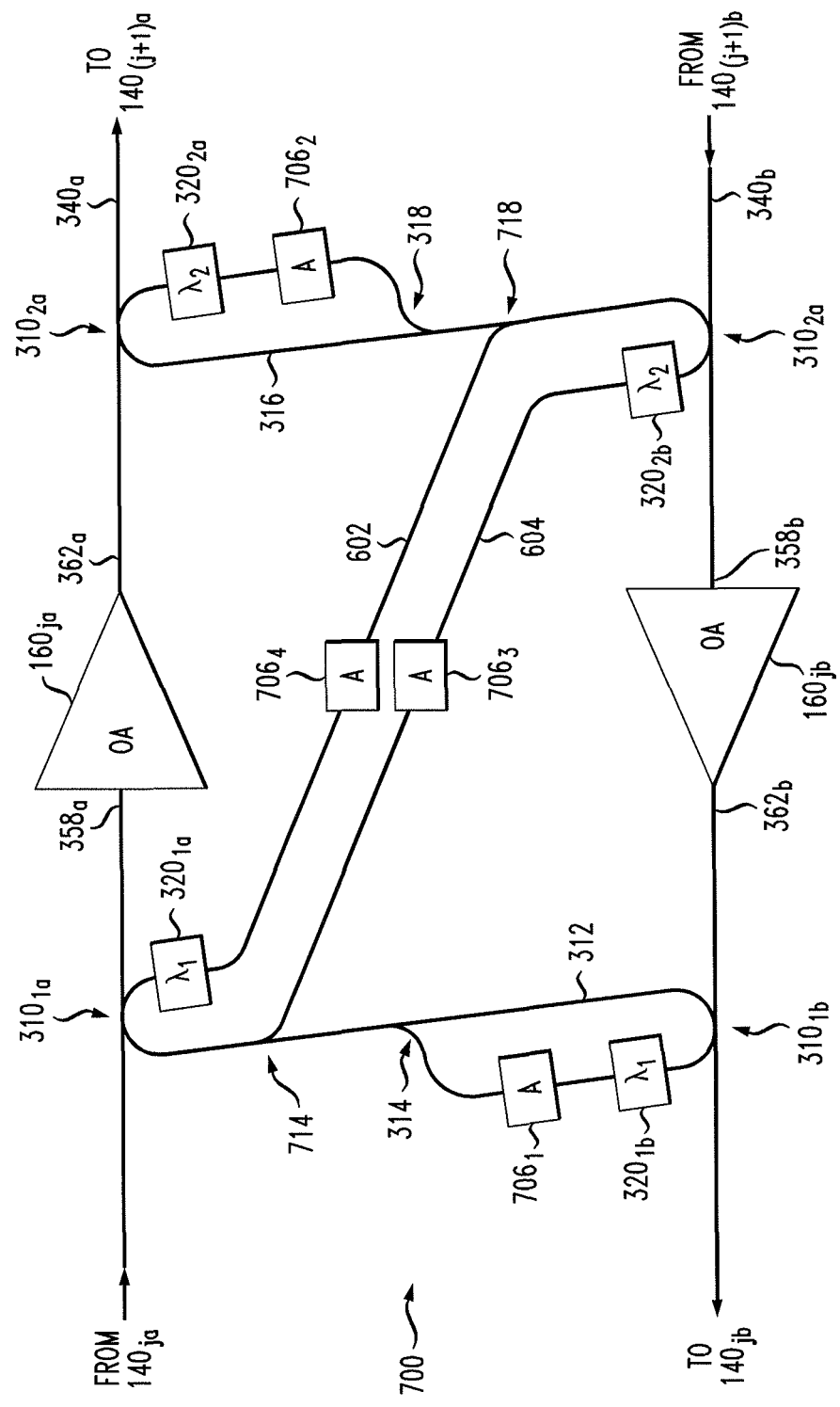
FIG. 7 shows a block diagram of an optical repeater that can be used in the optical transport system of FIG. 1 according to yet another embodiment.

FIG. 7 shows a block diagram of an optical repeater $150_j$ according to yet another embodiment. Connections of optical repeater $150_j$ to optical fibers $140_{ja}$, $140_{jb}$, $140_{(j+1)a}$, and $140_{(j+1)b}$ of wet plant $104$ are also shown in FIG. 7 to better indicate the relationship between the optical circuits of FIGS. 1 and 7.

In the embodiment of optical repeater $150$ shown in FIG. 7, supervisory optical circuit $600$ (FIG. 6) is replaced by a supervisory optical circuit $700$. Circuit $700$ differs from circuit $600$ as follows:

(i) optical couplers $330_a$ and $330_b$ are removed;
(ii) NBPOF $320_{1b}$ and optical fiber $312$ are connected to optical coupler $310_{1a}$ by way of a 2×1 optical coupler $714$ that is inserted into optical fiber $604$ as indicated in FIG. 7; and (iii) NBPOF $320_{2a}$ and optical fiber $316$ are connected to optical coupler $310_{2b}$ by way of a 2×1 optical coupler $718$ that is inserted into optical fiber $602$ as further indicated in FIG. 7.

Also shown in FIG. 7 are optional optical attenuators $706_1$-$706_4$. Optical attenuator $706_1$ is inserted between NBPOF $320_{1b}$ and optical coupler $314$. Optical attenuator $706_2$ is inserted between NBPOF $320_{1b}$ and optical coupler $314$. Optical attenuator $706_3$ is inserted into optical fiber $604$ between optical coupler $310_{1a}$ and optical coupler $714$. Optical attenuator $706_4$ is inserted into optical fiber $602$ between optical coupler $310_{2b}$ and optical coupler $718$.

Optical attenuators $706_1$-$706_4$ may be used in some embodiments to prevent spontaneous light generation in the "ring laser" that may be formed and become active due to the presence of output-to-input optical paths between optical amplifiers $160_{ja}$ and $160_{ja}$ provided by circuit $700$. A person of ordinary skill in the art will understand that such spontaneous light generation may render optical repeater $150_j$ unusable, e.g., due to the high noise level caused thereby. The use of these and possibly other optional elements for the indicated purpose is not limited to the embodiment of optical repeater $150_j$ shown in FIG. 7 and, if necessary, may similarly be implemented in the embodiments of optical repeater $150_j$ shown in FIGS. 3-6.

In operation circuit $700$ provides the following loop-back paths for the supervisory optical signals of carrier wavelengths $\lambda_1$ and $\lambda_2$. For brevity, the description of these loop-back paths is given for an embodiment of circuit $700$ in which optional optical attenuators $706_1$-$706_4$ are not present.

A portion of a supervisory optical signal of carrier wavelength $\lambda_1$ received from optical fiber $140_{ja}$ can be looped back into optical fiber $140_{jb}$, e.g., as follows. Optical path $340_a$ directs the optical signal received through optical fiber $140_{ja}$ to optical coupler $310_1$a. Optical coupler $310_{1a}$ operates to cause the coupled optical signal to be directed through NBPOF $320_{1a}$ that passes the $\lambda_1$ component thereof and essentially stops all other spectral components thereof. The filtered $\lambda_1$ component is directed by optical fiber $602$, by way of optical coupler $718$, to optical coupler $310_{2b}$, which further directs it to input port $358_b$ of optical amplifier $160_{jb}$. The resulting amplified signal of carrier wavelength $\lambda_1$ is then directed from output port $362_b$ of optical amplifier $160_{jb}$ to optical fiber $140_{jb}$.

A portion of a supervisory optical signal of carrier wavelength $\lambda_2$ received from optical fiber $140_{ja}$ can be looped back into optical fiber $140_{jb}$, e.g., as follows. Optical path $340_a$ directs the optical signal received through optical fiber $140_{ja}$ to optical amplifier $160_{ja}$, where the latter undergoes optical amplification. The resulting amplified signal is directed from output port $362_a$ of optical amplifier $160_{ja}$ to optical coupler $310_{2a}$. Optical coupler $310_{2a}$ operates to cause the coupled optical signal to be directed through NBPOF $320_2$a that passes the $\lambda_2$ component thereof and essentially stops all other spectral components thereof. The filtered $\lambda_2$ component is coupled by optical couplers $318$ and $718$ into optical fiber $602$, which directs it to optical amplifier $160_{jb}$ by way of optical coupler $310_{2b}$. The resulting amplified signal of carrier wavelength $\lambda_2$ is then directed from output port $362_b$ of optical amplifier $160_{jb}$ to optical fiber $140_{jb}$.

A portion of a supervisory optical signal of carrier wavelength $\lambda_1$ received from optical fiber $140_{(j+1)b}$ can be looped back into optical fiber $140_{(j+1)a}$, e.g., as follows. Optical path $340_b$ directs the optical signal received through optical fiber $140_{(j+1)b}$ to optical amplifier $160_{jb}$, where the latter undergoes optical amplification. The resulting amplified signal is directed from output port $362_b$ of optical amplifier $160_{jb}$ to optical coupler $310_{1b}$. Optical coupler $310_{1b}$ operates to cause the coupled optical signal to be directed through NBPOF $320_{1b}$ that passes the $\lambda_1$ component thereof and essentially stops all other spectral components thereof. The filtered $\lambda_1$ component is coupled by optical couplers 314 and 714 into optical fiber 604, which directs it to optical amplifier $160_{ja}$ by way of optical coupler $310_{1a}$. The resulting amplified signal of carrier wavelength $\lambda_1$ is then directed from output port $360_a$ of optical amplifier $160_{ja}$ to optical fiber $140_{(j+1)a}$.

A portion of a supervisory optical signal of carrier wavelength $\lambda_2$ received from optical fiber $140_{(j+1)b}$ can be looped back into optical fiber $140_{(j+1)a}$, e.g., as follows. Optical path $340_b$ directs the optical signal received through optical fiber $140_{(j+1)b}$ to optical coupler $310_{2b}$. Optical coupler $310_{2b}$ operates to cause the coupled optical signal to be directed through NBPOF $320_{2b}$ that passes the $\lambda_2$ component thereof and essentially stops all other spectral components thereof. The filtered $\lambda_2$ component is directed by optical fiber 604, by way of optical coupler 714, to optical coupler $310_{1a}$, which further directs it to input port $358_a$ of optical amplifier $160_{ja}$. The resulting amplified signal of carrier wavelength $\lambda_2$ is then directed from output port $362_a$ of optical amplifier $160_{ja}$ to optical fiber $140_{(j+1)a}$.

In addition, circuit 700 provides substantially the same optical pathways for the backscattered light as circuit 600, by way of optical fibers or waveguides 312 and 316, which are merged with optical fibers or waveguides 604 and 602, respectively.

Figure 8:
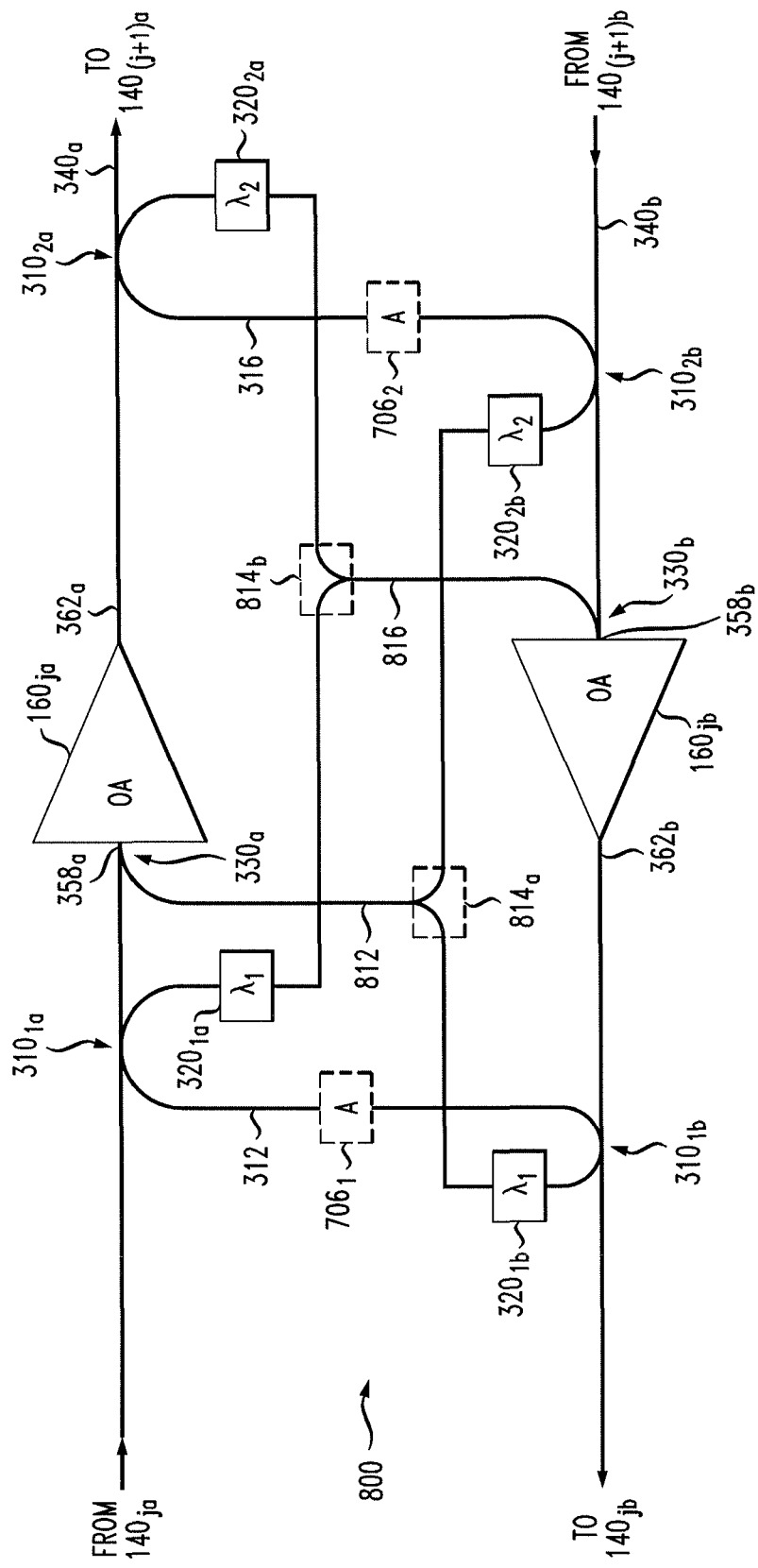
FIG. 8 shows a block diagram of an optical repeater that can be used in the optical transport system of FIG. 1 according to yet another embodiment.

FIG. 8 shows a block diagram of an optical repeater $150_j$ according to yet another embodiment. Connections of optical repeater 150 to optical fibers $140_{ja}$, $140_{jb}$, $140_{(j+1)a}$, and $140_{(j+1)b}$ of wet plant 104 are also shown in FIG. 8 to better indicate the relationship between the optical circuits of FIGS. 1 and 8.

The embodiment of optical repeater $150_j$ shown in FIG. 8 comprises a supervisory optical circuit 800 that optically couples optical paths $340_a$ and $340_b$ as described in more detail below. Circuit 800 is constructed using many of the same components as the above-described supervisory optical circuits 300-700. These components are labeled in FIG. 8 using the same labels as in FIGS. 3-7, and their description is not repeated here.

Similar to circuits 300-700, circuit 800 is configured to provide: (i) loop-back paths for the supervisory optical signals of carrier wavelengths $\lambda_1$ and $\lambda_2$; (ii) an optical pathway for the backscattered light of substantially any wavelength to cross from optical path $340_a$ to optical path $340_b$; and (iii) an optical pathway for the backscattered light of substantially any wavelength to cross from optical path $340_b$ to optical path $340_a$. However, circuit 800 differs from each of circuits 300-700 in that the loop-back paths and the backscattered-light pathways are substantially independent from each other. This characteristic of circuit 800 can be used to obtain certain engineering benefits, e.g., as described in more detail below.

In an example embodiment, circuit 800 can be a planar lightwave circuit or a part of a planar lightwave circuit.

In operation, circuit 800 provides the following loop-back paths for the supervisory optical signals of carrier wavelengths $\lambda_1$ and $\lambda_2$.

A portion of a supervisory optical signal of carrier wavelength $\lambda_2$ received from optical fiber $140_{ja}$ can be looped back into optical fiber $140_{jb}$, e.g., as follows. Optical path $340_a$ directs the optical signal received through optical fiber $140_{ja}$ to optical coupler $160_{ja}$, where the latter undergoes optical amplification. The resulting amplified signal is directed from output port $360_a$ of optical amplifier $160_{ja}$ to optical coupler $310_{2a}$. Optical coupler $310_{2a}$ operates to cause the coupled optical signal to be directed through NBPOF $320_{2a}$ that passes the $\lambda_2$ component thereof and essentially stops all other spectral components thereof. The filtered $\lambda_2$ component is coupled by an optical coupler $814_b$ into an optical fiber (or optical waveguide) 816 that directs it to input port $358_b$ of optical amplifier $160_{jb}$ by way of optical coupler $330_b$. The resulting amplified signal of carrier wavelength $\lambda_2$ is then directed from output port $362_b$ of optical amplifier $160_{jb}$ to optical fiber $140_{jb}$.

A portion of a supervisory optical signal of carrier wavelength $\lambda_1$ received from optical fiber $140_{(j+1)b}$ can be looped back into optical fiber $140_{(j+1)a}$, e.g., as follows. Optical path $340_b$ directs the optical signal received through optical fiber $140_{(j+1)b}$ to optical amplifier $160_{jb}$, where the latter undergoes optical amplification. The resulting amplified signal is directed from output port $362_b$ of optical amplifier $160_{jb}$ to optical coupler $310_{1b}$. Optical coupler $310_{1b}$ operates to cause the coupled optical signal to be directed through NBPOF $320_{1b}$ that passes the $\lambda_1$ component thereof and essentially stops all other spectral components thereof. The filtered $\lambda_1$ component is coupled by optical coupler $814_a$ into an optical fiber (or optical waveguide) 812 that directs it to input port $358_a$ of optical amplifier $160_{ja}$ by way of optical coupler $330_a$. The resulting amplified signal of carrier wavelength $\lambda_1$ is then directed from output port $362_a$ of optical amplifier $160_{ja}$ to optical fiber $140_{(j+1)a}$.

A portion of a supervisory optical signal of carrier wavelength $\lambda_1$ received from optical fiber $140_{ja}$ can be looped back into optical fiber $140_{jb}$, e.g., as follows. Optical path $340_a$ directs the optical signal received through optical fiber $140_{ja}$ to optical coupler $310_{1a}$. Optical coupler $310_1a$ operates to cause the coupled optical signal to be directed through NBPOF $320_1a$ that passes the $\lambda_1$ component thereof and essentially stops all other spectral components thereof. The filtered $\lambda_1$ component is coupled by optical coupler $814_b$ into optical fiber 816, which directs it to input port $358_b$ of optical amplifier $160_{jb}$ by way of optical coupler $330_b$. The resulting amplified signal of carrier wavelength $\lambda_1$ is then directed from output port $362_b$ of optical amplifier $160_{jb}$ to optical fiber $140_{jb}$.

A portion of a supervisory optical signal of carrier wavelength $\lambda_2$ received from optical fiber $140_{(j+1)b}$ can be looped back into optical fiber $140_{(j+1)a}$, e.g., as follows. Optical path $340_b$ directs the optical signal received through optical fiber $140_{(j+1)b}$ to optical coupler $310_{2b}$. Optical coupler $310_{2b}$ operates to cause the coupled optical signal to be directed through NBPOF $320_{2b}$ that passes the $\lambda_2$ component thereof and essentially stops all other spectral components thereof. The filtered $\lambda_2$ component is coupled by optical coupler $814_a$ into optical fiber 812, which directs it to input port $358_a$ of optical amplifier $160_{ja}$ by way of optical coupler $330_a$. The resulting amplified signal of carrier wavelength $\lambda_2$ is then directed from output port $362_a$ of optical amplifier $160_{ja}$ to optical fiber $140_{(j+1)a}$.

In addition, circuit 800 provides the following optical pathways for the backscattered light of substantially any wavelength.

The backscattered light received from optical fiber $140_{(j+1)a}$ can cross from optical path $340_a$ to optical path $340_b$ by first being coupled by optical coupler $310_{2a}$ into optical fiber (or optical waveguide) 316 and then being coupled by optical coupler $310_{2b}$ out of optical fiber 316 and directed thereby to input port $358_b$ of optical amplifier $160_{jb}$.

The backscattered light received from optical fiber $140_{jb}$ can cross from optical path $340_b$ to optical path $340_a$ by first being coupled by optical coupler $310_{1b}$ into optical fiber (or optical waveguide) 312 and then being coupled by optical coupler $310_{1a}$ out of optical fiber 312 and directed thereby to input port $358_a$ of optical amplifier $160_{ja}$.

Note that, in circuit 800, each of optical fibers (or optical waveguides) 312 and 316 is configured to guide substantially only backscattered light. For comparison, in circuit 300 (FIG. 3), the portion of optical fiber 312 between optical couplers 314 and $330_a$ can carry both backscattered light and a supervisory optical signal of carrier wavelength $\lambda_1$; and the portion of optical fiber 316 between optical couplers 318 and $330_b$ can carry both backscattered light and a supervisory optical signal of carrier wavelength $\lambda_2$. As another example, in circuit 400 (FIG. 4), the whole length of optical fiber 312 can carry both backscattered light and a supervisory optical signal of carrier wavelength $\lambda_1$; and the whole length of optical fiber 316 can carry both backscattered light and a supervisory optical signal of carrier wavelength $\lambda_2$. Furthermore, some portions of optical fibers 312 and 316 in circuit 400 carry counter-propagating optical signals.

The above-indicated distinguishing feature of circuit 800 can advantageously be used, e.g., to separately control the attenuation of the backscattered light and supervisory optical signals, which is more difficult to do in any of circuits 300-700. For example, in one possible embodiment, optional optical attenuators $706_1$ and $706_2$ can be inserted into optical fibers (or optical waveguides) 312 and 316, respectively, as shown in FIG. 8 to control the attenuation of the backscattered light without affecting the supervisory optical signals. In another possible embodiment, optical couplers $310_{1a}$, $310_{2a}$, $310_{1b}$, and $310_{2b}$ can be designed to have desired respective coupling ratios for the same purpose. In some embodiments, additional optional optical attenuators (not explicitly shown in FIG. 8) can be used to control the attenuation of the supervisory optical signals without affecting the backscattered light.

In operation, ME unit $120_1$ (FIG. 1) can use a supervisory optical signal of carrier wavelength $\lambda_1$ to monitor the optical power at input port $358_a$ of optical amplifier $160_{ja}$. ME unit $120_1$ (FIG. 1) can use a supervisory optical signal of carrier wavelength $\lambda_2$ to monitor the optical power at output port $362_a$ of optical amplifier $160_{ja}$. Based on the measurement of the input and output optical powers, ME unit $120_1$ can also determine and monitor over time the optical gain of optical amplifier $160_{ja}$. ME unit $120_1$ (FIG. 1) can further use circuit 800 to carry out in-band or out-of-band coherent-OTDR measurements in addition to the optical power monitoring, substantially without affecting the latter.

ME unit $120_2$ (FIG. 1) can similarly use a supervisory optical signal of carrier wavelength $\lambda_2$ to monitor the optical power at input port $358_b$ of optical amplifier $160_{jb}$. ME unit $120_2$ (FIG. 1) can use a supervisory optical signal of carrier wavelength $\lambda_1$ to monitor the optical power at output port $362_b$ of optical amplifier $160_{jb}$. Based on the measurement of the input and output optical powers, ME unit $120_2$ can also determine and monitor over time the optical gain of optical amplifier $160_{jb}$. ME unit $120_2$ (FIG. 1) can further use circuit 800 to carry out in-band or out-of-band coherent-OTDR measurements in addition to the optical power monitoring, substantially without affecting the latter.

According to an example embodiment disclosed above in reference to FIGS. 1-8, provided is an apparatus (e.g., 100, FIG. 1) comprising: a first optical amplifier (e.g., $160_{ja}$, FIG. 1) located in a first optical path (e.g., $340_a$, FIGS. 3-8) and configured to amplify optical signals transmitted in a first direction; a second optical amplifier (e.g., $160_{jb}$, FIG. 1) located in a second optical path (e.g., $340_b$, FIGS. 3-8) and configured to amplify optical signals transmitted in a second direction, the second direction being opposite to the first direction; and an optical circuit (e.g., 300, FIG. 3; 500, FIG. 5) connected to optically couple an optical output port (e.g., $360_a$, FIG. 3) of the first optical amplifier and a first optical port (e.g., $358_b$ or $362_b$, FIGS. 3, 5) of the second optical amplifier; and wherein an optical connection, through the optical circuit, between the optical output port of the first optical amplifier and the first optical port of the second optical amplifier comprises: a first optical pathway (e.g., through $320_{2a}$, FIG. 3 or 5) configured to direct light traveling in the first direction at the optical output port of the first optical amplifier to the first optical port of the second optical amplifier in a manner that causes the light so directed to travel in the second direction at the first optical port of the second optical amplifier; and a second optical pathway (e.g., 316, FIGS. 3, 8; 512, FIG. 5) configured to direct light traveling in the second direction at the optical output port of the first optical amplifier to the first optical port of the second optical amplifier in a manner that causes the light so directed to travel in the second direction at the first optical port of the second optical amplifier; wherein the first optical pathway includes a first narrow band-pass optical filter (e.g., $320_{2a}$, FIG. 3, 5) located therein; and wherein the second optical pathway is configured to bypass the first narrow band-pass optical filter.

In some embodiments of the above apparatus, the first optical port is an input port (e.g., $358_b$, FIG. 3) of the second optical amplifier.

In some embodiments of any of the above apparatus, the first optical port is an output port (e.g., $362_b$, FIG. 5) of the second optical amplifier.

In some embodiments of any of the above apparatus, the optical connection, through the optical circuit, between the optical output port of the first optical amplifier and the first optical port of the second optical amplifier further comprises a third optical pathway (e.g., through $320_{2b}$, FIG. 4; or through $320_{1b}$, FIG. 5) configured to direct light traveling in the second direction at the first optical port of the second optical amplifier to the optical output port of the first optical amplifier in a manner that causes the light so directed to travel in the first direction at the optical output port of the first optical amplifier; and wherein the third optical pathway includes a second narrow band-pass optical filter (e.g., $320_{2b}$ FIG. 4; or $320_{1b}$, FIG. 5) located therein.

In some embodiments of any of the above apparatus, the second optical pathway is configured to bypass the second narrow band-pass optical filter.

In some embodiments of any of the above apparatus, the first optical port is an input port (e.g., $358_b$, FIG. 4) of the second optical amplifier.

In some embodiments of any of the above apparatus, the first optical port is an output port (e.g., $362_b$, FIG. 5) of the second optical amplifier.

In some embodiments of any of the above apparatus, the first narrow band-pass optical filter has a transfer function (e.g., 202, FIG. 2) that causes the first narrow band-pass optical filter to pass a first wavelength (e.g., $\lambda_2$, FIG. 5) and reject a second wavelength (e.g., $\lambda_1$, FIG. 5); and wherein the second narrow band-pass optical filter has a transfer function (e.g., 202, FIG. 2) that causes the second narrow band-pass optical filter to pass the second wavelength and reject the first wavelength.

In some embodiments of any of the above apparatus, each of the first and second optical amplifiers is configured to amplify a respective WDM signal transmitted therethrough, the respective WDM signal configured to include a plurality of spectral components, each of the spectral components having a respective wavelength (e.g., $\lambda_3$-$\lambda_n$, FIG. 1) different from the first and second wavelengths; and wherein the first wavelength, the second wavelength, and the respective wavelengths are spectrally arranged in accordance with a wavelength grid.

In some embodiments of any of the above apparatus, the second narrow band-pass optical filter (e.g., $320_{2b}$, FIG. 4) is a nominal copy of the first narrow band-pass optical filter (e.g., $320_{2a}$, FIG. 4).

In some embodiments of any of the above apparatus, the optical circuit is further connected to optically couple an optical input port (e.g., $358_a$, FIG. 3) of the first optical amplifier and a second optical port (e.g., $362_b$ or $358_b$, FIGS. 3, 5) of the second optical amplifier; and wherein an optical connection, through the optical circuit, between the optical input port of the first optical amplifier and the second optical port of the second optical amplifier comprises: a third optical pathway (e.g., through $320_{1b}$, FIG. 3) configured to direct light traveling in the second direction at the second optical port of the second optical amplifier to the optical input port of the first optical amplifier in a manner that causes the light so directed to travel in the first direction at the optical input port of the first optical amplifier; and a fourth optical pathway (e.g., 312, FIGS. 3, 8; 516, FIG. 5) configured to direct light traveling in the first direction at the second optical port of the second optical amplifier to the optical input port of the first optical amplifier in a manner that causes the light so directed to travel in the first direction at the optical input port of the first optical amplifier; wherein the third optical pathway includes a second narrow band-pass optical filter (e.g., $320_{1b}$, FIG. 3) located therein; and wherein the fourth optical pathway is configured to bypass the second narrow band-pass optical filter.

In some embodiments of any of the above apparatus, the first optical port is an input port (e.g., $358_b$, FIG. 3) of the second optical amplifier; and wherein the second optical port is an output port (e.g., $362_b$, FIG. 3) of the second optical amplifier.

In some embodiments of any of the above apparatus, the first optical port is an output port (e.g., $362_b$, FIG. 5) of the second optical amplifier; and wherein the second optical port is an input port (e.g., $358_b$, FIG. 5) of the second optical amplifier.

In some embodiments of any of the above apparatus, the first narrow band-pass optical filter has a transfer function (e.g., 202, FIG. 2) that causes the first narrow band-pass optical filter to pass a first wavelength (e.g., $\lambda_2$, FIG. 3) and reject a second wavelength (e.g., $\lambda_1$, FIG. 3); and wherein the second narrow band-pass optical filter has a transfer function (e.g., 202, FIG. 2) that causes the second narrow band-pass optical filter to pass the second wavelength and reject the first wavelength.

In some embodiments of any of the above apparatus, the optical connection, through the optical circuit, between the optical output port of the first optical amplifier and the first optical port of the second optical amplifier further comprises a fifth optical pathway (e.g., through $320_{2b}$, FIG. 4) configured to direct light traveling in the second direction at the first optical port of the second optical amplifier to the optical output port of the first optical amplifier in a manner that causes the light so directed to travel in the first direction at the optical output port of the first optical amplifier; and wherein the fifth optical pathway includes a third narrow band-pass optical filter (e.g., $320_{2b}$, FIG. 4) located therein.

In some embodiments of any of the above apparatus, the first narrow band-pass optical filter has a transfer function (e.g., 202, FIG. 2) that causes the first narrow band-pass optical filter to pass a first wavelength (e.g., $\lambda_2$, FIG. 3) and reject a second wavelength (e.g., $\lambda_1$, FIG. 3); wherein the second narrow band-pass optical filter has a transfer function (e.g., 202, FIG. 2) that causes the second narrow band-pass optical filter to pass the second wavelength and reject the first wavelength; and wherein the third narrow band-pass optical filter (e.g., $320_{2b}$, FIG. 4) is a nominal copy of the first narrow band-pass optical filter (e.g., $320_{2a}$, FIG. 4).

In some embodiments of any of the above apparatus, the optical connection, through the optical circuit, between the optical input port of the first optical amplifier and the second optical port of the second optical amplifier further comprises a sixth optical pathway (e.g., through $320_{1a}$, FIG. 4) configured to direct light traveling in the first direction at the optical input port of the first optical amplifier to the second optical port of the second optical amplifier in a manner that causes the light so directed to travel in the second direction at the second optical port of the second optical amplifier; and wherein the sixth optical pathway includes a fourth narrow band-pass optical filter (e.g., $320_{1a}$, FIG. 4) located therein.

In some embodiments of any of the above apparatus, the first narrow band-pass optical filter has a transfer function (e.g., 202, FIG. 2) that causes the first narrow band-pass optical filter to pass a first wavelength (e.g., $\lambda_2$, FIG. 3) and reject a second wavelength (e.g., $\lambda_1$, FIG. 3); wherein the second narrow band-pass optical filter has a transfer function (e.g., 202, FIG. 2) that causes the second narrow band-pass optical filter to pass the second wavelength and reject the first wavelength; wherein the third narrow band-pass optical filter (e.g., $320_{2b}$, FIG. 4) is a nominal copy of the first narrow band-pass optical filter (e.g., $320_{2a}$, FIG. 4); and wherein the fourth narrow band-pass optical filter (e.g., $320_{1a}$, FIG. 4) is a nominal copy of the second narrow band-pass optical filter (e.g., $320_{1b}$, FIG. 4).

In some embodiments of any of the above apparatus, the first narrow band-pass optical filter has a transfer function (e.g., 202, FIG. 2) characterized by a bandwidth (e.g., B, FIG. 2A); and wherein the first narrow band-pass optical filter does not employ a mirror configured to reflect in an opposite direction light applied thereto by the first optical pathway, the light being spectrally located within the bandwidth.

In some embodiments of any of the above apparatus, the apparatus comprises a planar lightwave circuit (e.g., 300, FIG. 3), wherein the first narrow band-pass optical filter is a part of the planar lightwave circuit.

In some embodiments of any of the above apparatus, the first optical port is an optical input port (e.g., $358_b$ FIG. 8) of the second optical amplifier; wherein the optical circuit is further connected to optically couple an optical input port (e.g., $358_a$, FIG. 8) of the first optical amplifier and the optical input port of the second optical amplifier; wherein an optical connection, through the optical circuit, between the optical input port of the first optical amplifier and the optical input port of the second optical amplifier comprises a third optical pathway (e.g., through $320_{1a}$, FIG. 8) configured to direct light traveling in the first direction at the optical input port of the first optical amplifier to the optical input port of the second optical amplifier in a manner that causes the light so directed to travel in the second direction at the optical input port of the second optical amplifier; and wherein the third optical pathway includes a second narrow band-pass optical filter (e.g., $320_{1a}$, FIG. 8) located therein.

In some embodiments of any of the above apparatus, the optical circuit comprises: an optical coupler (e.g., $814_b$, FIG. 8) configured to connect the first optical pathway and the third optical pathway; and an optical waveguide (e.g., 816, FIG. 8) connected to the optical coupler, the optical waveguide being a portion of the first optical pathway and a portion of the third optical pathway.

In some embodiments of any of the above apparatus, the optical circuit is further connected to optically couple the optical input port of the first optical amplifier and an optical output port (e.g., $362_b$, FIG. 8) of the second optical amplifier; wherein an optical connection, through the optical circuit, between the optical input port of the first optical amplifier and the optical output port of the second optical amplifier comprises: a fourth optical pathway (e.g., through $320_{1b}$, FIG. 8) configured to direct light traveling in the second direction at the optical output port of the second optical amplifier to the optical input port of the first optical amplifier in a manner that causes the light so directed to travel in the first direction at the optical input port of the first optical amplifier; and a fifth optical pathway (e.g., 312, FIG. 8) configured to direct light traveling in the first direction at the optical output port of the second optical amplifier to the optical input port of the first optical amplifier in a manner that causes the light so directed to travel in the first direction at the optical input port of the first optical amplifier; wherein the fourth optical pathway includes a third narrow band-pass optical filter (e.g., $320_{1b}$, FIG. 8) located therein; and wherein the fifth optical pathway is configured to bypass the third narrow band-pass optical filter.

In some embodiments of any of the above apparatus, the optical connection, through the optical circuit, between the optical input port of the first optical amplifier and the optical input port of the second optical amplifier comprises a sixth optical pathway (e.g., through $320_{2b}$, FIG. 8) configured to direct light traveling in the second direction at the optical input port of the second optical amplifier to the optical input port of the first optical amplifier in a manner that causes the light so directed to travel in the first direction at the optical input port of the first optical amplifier; and wherein the sixth optical pathway includes a fourth narrow band-pass optical filter (e.g., $320_{2b}$, FIG. 8) located therein.

In some embodiments of any of the above apparatus, the optical circuit comprises: a first optical coupler (e.g., $814_b$, FIG. 8) configured to connect the first optical pathway and the third optical pathway; a first optical waveguide (e.g., 816, FIG. 8) connected to the first optical coupler, the first optical waveguide being a portion of the first optical pathway and a portion of the third optical pathway; a second optical coupler (e.g., $814_a$, FIG. 8) configured to connect the fourth optical pathway and the sixth optical pathway; and a second optical waveguide (e.g., 812, FIG. 8) connected to the second optical coupler, the second optical waveguide being a portion of the fourth optical pathway and a portion of the sixth optical pathway.

In some embodiments of any of the above apparatus, the second optical pathway is further configured to bypass the second, third, and fourth narrow band-pass optical filters; and wherein the fifth optical pathway is further configured to bypass the first, second, and fourth narrow band-pass optical filters.

According to another example embodiment disclosed above in reference to FIGS. 1-8, provided is a communication method comprising the steps of: configuring a first optical amplifier (e.g., $160_{ja}$, FIG. 1) located in a first optical path (e.g., $340_a$, FIGS. 3-8) to amplify optical signals transmitted in a first direction; configuring a second optical amplifier (e.g., $160_{jb}$, FIG. 1) located in a second optical path (e.g., $340_b$, FIGS. 3-8) to amplify optical signals transmitted in a second direction, the second direction being opposite to the first direction; and connecting an optical circuit (e.g., 300, FIG. 3; 500, FIG. 5) to optically couple an optical output port (e.g., $362_a$, FIG. 3) of the first optical amplifier and a first optical port (e.g., $358_b$ or $362_b$, FIGS. 3, 5) of the second optical amplifier; and wherein said connecting comprises: providing a first optical pathway (e.g., through $320_{2a}$, FIG. 3 or 5) configured to direct light traveling in the first direction at the optical output port of the first optical amplifier to the first optical port of the second optical amplifier in a manner that causes the light so directed to travel in the second direction at the first optical port of the second optical amplifier; and providing a second optical pathway (e.g., 316, FIGS. 3, 8; 512, FIG. 5) configured to direct light traveling in the second direction at the optical output port of the first optical amplifier to the first optical port of the second optical amplifier in a manner that causes the light so directed to travel in the second direction at the first optical port of the second optical amplifier; wherein the first optical pathway includes a first narrow band-pass optical filter (e.g., $320_{2a}$, FIG. 3, 5, 8) located therein; and wherein the second optical pathway is configured to bypass the first narrow band-pass optical filter.

In some embodiments of the above method, the first optical port is an optical input port (e.g., $358_b$, FIG. 8) of the second optical amplifier; wherein the method further comprises further connecting the optical circuit to optically couple an optical input port (e.g., $358_a$, FIG. 8) of the first optical amplifier and the optical input port of the second optical amplifier; wherein said further connecting comprises providing a third optical pathway (e.g., through $320_{1a}$, FIG. 8) configured to direct light traveling in the first direction at the optical input port of the first optical amplifier to the optical input port of the second optical amplifier in a manner that causes the light so directed to travel in the second direction at the optical input port of the second optical amplifier; and wherein the third optical pathway includes a second narrow band-pass optical filter (e.g., $320_{1a}$, FIG. 8) located therein.

In some embodiments of any of the above methods, the method further comprises additionally connecting the optical circuit to optically couple the optical input port of the first optical amplifier and an optical output port (e.g., $362_b$, FIG. 8) of the second optical amplifier; wherein said additionally connecting comprises: providing a fourth optical pathway (e.g., through $320_{1b}$, FIG. 8) configured to direct light traveling in the second direction at the optical output port of the second optical amplifier to the optical input port of the first optical amplifier in a manner that causes the light so directed to travel in the first direction at the optical input port of the first optical amplifier; and providing a fifth optical pathway (e.g., 312, FIG. 8) configured to direct light traveling in the first direction at the optical output port of the second optical amplifier to the optical input port of the first optical amplifier in a manner that causes the light so directed to travel in the first direction at the optical input port of the first optical amplifier; wherein the fourth optical pathway includes a third narrow band-pass optical filter (e.g., $320_{1b}$, FIG. 8) located therein; and wherein the fifth optical pathway is configured to bypass the third narrow band-pass optical filter.

In some embodiments of any of the above methods, said additionally connecting comprises providing a sixth optical pathway (e.g., through $320_{2b}$, FIG. 8) configured to direct light traveling in the second direction at the optical input port of the second optical amplifier to the optical input port of the first optical amplifier in a manner that causes the light so directed to travel in the first direction at the optical input port of the first optical amplifier; and wherein the sixth optical pathway includes a fourth narrow band-pass optical filter (e.g., $320_{2b}$, FIG. 8) located therein.

While this disclosure includes references to illustrative embodiments, this specification is not intended to be construed in a limiting sense.

For example, although various embodiments are described above in reference to wet plant 104 and submersible optical repeaters 150, the invention is not so limited. From the provided description, a person of ordinary skill in the art will understand how to make and use embodiments that are suitable for use in a terrestrial optical network, wherein at least one optical repeater 150 is located in a remote or difficult-to-access area that is not necessarily under water.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

What is claimed is:

1. An apparatus comprising:
    a first optical amplifier located in a first optical path and configured to amplify optical signals transmitted in a first direction;
    a second optical amplifier located in a second optical path and configured to amplify optical signals transmitted in a second direction, the second direction being opposite to the first direction; and
    an optical circuit connected to optically couple an optical output port of the first optical amplifier and an optical input port of the second optical amplifier and further connected to optically couple an optical input port of the first optical amplifier and the optical input port of the second optical amplifier; and
    wherein an optical connection, through the optical circuit, between the optical output port of the first optical amplifier and the optical input port of the second optical amplifier comprises:
        a first optical pathway configured to direct light traveling in the first direction at the optical output port of the first optical amplifier to the optical input port of the second optical amplifier in a manner that causes the light so directed to travel in the second direction at the optical input port of the second optical amplifier; and
        a second optical pathway configured to direct light traveling in the second direction at the optical output port of the first optical amplifier to the optical input port of the second optical amplifier in a manner that causes the light so directed to travel in the second direction at the optical input port of the second optical amplifier;
    wherein the first optical pathway includes a first narrow band-pass optical filter located therein;
    wherein the second optical pathway is configured to bypass the first narrow band-pass optical filter;
    wherein an optical connection, through the optical circuit, between the optical input port of the first optical amplifier and the optical input port of the second optical amplifier comprises a third optical pathway configured to direct light traveling in the first direction at the optical input port of the first optical amplifier to the optical input port of the second optical amplifier in a manner that causes the light so directed to travel in the second direction at the optical input port of the second optical amplifier;
    wherein the third optical pathway bypasses the first optical amplifier; and
    wherein the third optical pathway comprises an input connected to receive light traveling in the first direction at the optical input port of the first optical amplifier and an output connected to the optical input port of the second optical amplifier.

2. The apparatus of claim 1, wherein the third optical pathway includes a second narrow band-pass optical filter located therein.

3. The apparatus of claim 2, wherein the optical circuit comprises:
    an optical coupler configured to connect the first optical pathway and the third optical pathway; and
    an optical waveguide connected to the optical coupler, the optical waveguide being a portion of the first optical pathway and a portion of the third optical pathway.

4. The apparatus of claim 2,
    wherein the optical circuit is further connected to optically couple the optical input port of the first optical amplifier and an optical output port of the second optical amplifier;
    wherein an optical connection, through the optical circuit, between the optical input port of the first optical amplifier and the optical output port of the second optical amplifier comprises:
  a fourth optical pathway configured to direct light traveling in the second direction at the optical output port of the second optical amplifier to the optical input port of the first optical amplifier in a manner that causes the light so directed to travel in the first direction at the optical input port of the first optical amplifier; and
  a fifth optical pathway configured to direct light traveling in the first direction at the optical output port of the second optical amplifier to the optical input port of the first optical amplifier in a manner that causes the light so directed to travel in the first direction at the optical input port of the first optical amplifier;
wherein the fourth optical pathway includes a third narrow band-pass optical filter located therein; and
wherein the fifth optical pathway is configured to bypass the third narrow band-pass optical filter.

5. The apparatus of claim 4,
wherein the optical connection, through the optical circuit, between the optical input port of the first optical amplifier and the optical input port of the second optical amplifier comprises a sixth optical pathway configured to direct light traveling in the second direction at the optical input port of the second optical amplifier to the optical input port of the first optical amplifier in a manner that causes the light so directed to travel in the first direction at the optical input port of the first optical amplifier; and
wherein the sixth optical pathway includes a fourth narrow band-pass optical filter located therein.

6. The apparatus of claim 5, wherein the optical circuit comprises:
  a first optical coupler configured to connect the first optical pathway and the third optical pathway;
  a first optical waveguide connected to the first optical coupler, the first optical waveguide being a portion of the first optical pathway and a portion of the third optical pathway;
  a second optical coupler configured to connect the fourth optical pathway and the sixth optical pathway; and
  a second optical waveguide connected to the second optical coupler, the second optical waveguide being a portion of the fourth optical pathway and a portion of the sixth optical pathway.

7. The apparatus of claim 5,
wherein the second optical pathway is further configured to bypass the second, third, and fourth narrow band-pass optical filters; and
wherein the fifth optical pathway is further configured to bypass the first, second, and fourth narrow band-pass optical filters.

8. A communication method, comprising:
configuring a first optical amplifier located in a first optical path to amplify optical signals transmitted in a first direction;
configuring a second optical amplifier located in a second optical path to amplify optical signals transmitted in a second direction, the second direction being opposite to the first direction; and
connecting an optical circuit to optically couple an optical output port of the first optical amplifier and an optical input port of the second optical amplifier and to optically couple an optical input port of the first optical amplifier and the optical input port of the second optical amplifier; and
wherein said connecting comprises:
  providing a first optical pathway configured to direct light traveling in the first direction at the optical output port of the first optical amplifier to the optical input port of the second optical amplifier in a manner that causes the light so directed to travel in the second direction at the optical input port of the second optical amplifier; and
  providing a second optical pathway configured to direct light traveling in the second direction at the optical output port of the first optical amplifier to the optical input port of the second optical amplifier in a manner that causes the light so directed to travel in the second direction at the optical input port of the second optical amplifier;
wherein the first optical pathway includes a first narrow band-pass optical filter located therein;
wherein the second optical pathway is configured to bypass the first narrow band-pass optical filter;
wherein an optical connection, through the optical circuit, between the optical input port of the first optical amplifier and the optical input port of the second optical amplifier comprises a third optical pathway configured to direct light traveling in the first direction at the optical input port of the first optical amplifier to the optical input port of the second optical amplifier in a manner that causes the light so directed to travel in the second direction at the optical input port of the second optical amplifier;
wherein the third optical pathway bypasses the first optical amplifier; and
wherein the third optical pathway comprises an input connected to receive light traveling in the first direction at the optical input port of the first optical amplifier and an output connected to the optical input port of the second optical amplifier.

9. The method of claim 8, wherein the third optical pathway includes a second narrow band-pass optical filter located therein.

10. The method of claim 9,
wherein the method further comprises additionally connecting the optical circuit to optically couple the optical input port of the first optical amplifier and an optical output port of the second optical amplifier;
wherein said additionally connecting comprises:
  providing a fourth optical pathway configured to direct light traveling in the second direction at the optical output port of the second optical amplifier to the optical input port of the first optical amplifier in a manner that causes the light so directed to travel in the first direction at the optical input port of the first optical amplifier; and
  providing a fifth optical pathway configured to direct light traveling in the first direction at the optical output port of the second optical amplifier to the optical input port of the first optical amplifier in a manner that causes the light so directed to travel in the first direction at the optical input port of the first optical amplifier;
wherein the fourth optical pathway includes a third narrow band-pass optical filter located therein; and
wherein the fifth optical pathway is configured to bypass the third narrow band-pass optical filter.

11. The method of claim 10,
wherein said additionally connecting comprises providing a sixth optical pathway configured to direct light traveling in the second direction at the optical input port of the second optical amplifier to the optical input port of the first optical amplifier in a manner that causes the light so directed to travel in the first direction at the optical input port of the first optical amplifier; and wherein the sixth optical pathway includes a fourth narrow band-pass optical filter located therein.

* * * * *